United States Patent
Douglas et al.

(10) Patent No.: US 10,606,565 B2
(45) Date of Patent: *Mar. 31, 2020

(54) VISUAL DEVOPS SYSTEMS AND METHODS

(71) Applicant: Stackery, Inc., Portland, OR (US)

(72) Inventors: Chase Douglas, Portland, OR (US); Nathan Taggart, Portland, OR (US)

(73) Assignee: STACKERY, INC., Portland, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 16/144,578

(22) Filed: Sep. 27, 2018

(65) Prior Publication Data

US 2019/0028360 A1 Jan. 24, 2019

Related U.S. Application Data

(63) Continuation-in-part of application No. 15/877,262, filed on Jan. 22, 2018, now Pat. No. 10,089,082.

(60) Provisional application No. 62/452,764, filed on Jan. 31, 2017.

(51) Int. Cl.
| | |
|---|---|
| *G06F 8/34* | (2018.01) |
| *H04L 12/24* | (2006.01) |
| *G06F 9/455* | (2018.01) |
| *G06F 8/10* | (2018.01) |
| *G06F 9/445* | (2018.01) |

(52) U.S. Cl.
CPC ............. *G06F 8/34* (2013.01); *G06F 8/10* (2013.01); *G06F 9/44505* (2013.01); *G06F 9/45512* (2013.01); *H04L 41/145* (2013.01); *H04L 41/22* (2013.01); *H04L 41/0806* (2013.01); *H04L 41/0816* (2013.01); *H04L 41/0843* (2013.01); *H04L 41/0886* (2013.01)

(58) Field of Classification Search
CPC ............. H04L 41/0806; H04L 41/0816; H04L 41/0843; H04L 41/0886; H04L 41/145; H04L 41/22; G06F 8/10; G06F 8/34; G06F 9/44505; G06F 9/45512
USPC .................................................. 717/104, 105
See application file for complete search history.

(56) References Cited

U.S. PATENT DOCUMENTS

2004/0261058 A1* 12/2004 Kundert .......... G01R 31/318357
717/119
2008/0243897 A1* 10/2008 Petri .................... G06F 17/248
(Continued)

OTHER PUBLICATIONS

"IDE—VisualOps Documentation 1.0.0," <http://visualops.readthedocs.io/target/reference/ide.html>, 2014, p. 1-35. (Year: 2014).*
(Continued)

*Primary Examiner* — Qing Chen
(74) *Attorney, Agent, or Firm* — Alleman Hall Creasman & Tuttle LLP

(57) ABSTRACT

A visual devops application recognizes selection of a set of architectural resources, where at least one of the architectural resources requires two or more infrastructure resources to implement. The visual devops application visually presents a set of architectural nodes representing the architectural resources in an architectural flow diagram. The visual devops application maps the set of architectural nodes to a set of infrastructure resources sufficient to implement the set of architectural resources, and automatically provisions the set of infrastructure resources on one or more infrastructure computers.

18 Claims, 6 Drawing Sheets

(56) References Cited

U.S. PATENT DOCUMENTS

| | | | |
|---|---|---|---|
| 2009/0113402 A1* | 4/2009 | Chen | G06F 8/41 |
| | | | 717/140 |
| 2014/0039865 A1* | 2/2014 | Li | G06F 17/50 |
| | | | 703/18 |
| 2016/0117350 A1* | 4/2016 | Park | G06F 16/283 |
| | | | 707/602 |
| 2018/0167289 A1* | 6/2018 | Beyer | H04L 43/045 |

OTHER PUBLICATIONS

"Introduction—VisualOps Documentation 1.0.0," <http://visualops.readthedocs.io/target/getting-started.html>, 2014, p. 1-26. (Year: 2014).*

"VisualOps Document Release 1.0.0," Mar. 26, 2014, p. 1-52. (Year: 2014).*

\* cited by examiner

FIG. 4

| Serial# | NodeType | Contains | ContainedBy | PortMap |
|---|---|---|---|---|
| 1 | "RestApi" | { } | none | {2:332, 2:333} |
| 2 | "Function" | { } | 3 | { } |
| 3 | "VirtualNet" | {2,4,5} | none | { } |
| 4 | "LoadBal" | { } | 3 | {6:42, 7:51,52} |
| 5 | "ContClust" | {6, 7} | 3 | { } |
| 6 | "ContServ" | { } | 5 | { } |
| 7 | "ContServ" | { } | 5 | { } |

510 RECOGNIZE, IN COMPUTER-READABLE CONFIGURATION TEMPLATE HAVING FORMAT USEABLE TO PROVISION A SET OF INFRASTRUCTURE RESOURCES ON ONE OR MORE INFRASTRUCTURE COMPUTERS, A SET OF ARCHITECTURAL RESOURCES IMPLEMENTED BY THE SET OF INFRASTRUCTURE RESOURCES

↓

520 VISUALLY PRESENT SET OF ARCHITECTURAL NODES IN AN ARCHITECTURAL FLOW DIAGRAM DISPLAYED BY DEVELOPMENT COMPUTER, THE SET OF ARCHITECTURAL NODES REPRESENTING THE SET OF ARCHITECTURAL RESOURCES AND PRESENTED WITH AN AUTOMATIC LAYOUT REPRESENTING RELATIONSHIPS AMONG THE ARCHITECTURAL RESOURCES

↓

530 RECOGNIZE CHANGE TO ARCHITECTURAL FLOW DIAGRAM

↓

540 BASED ON CHANGE TO ARCHITECTURAL FLOW DIAGRAM, DEFINE CHANGED COMPUTER-READABLE CONFIGURATION TEMPLATE HAVING FORMAT USEABLE BY PROVISIONING COMPUTER TO PROVISION CHANGED SET OF INFRASTRUCTURE RESOURCES ON ONE OR MORE INFRASTRUCTURE COMPUTERS

↓

550 PROVISION CHANGED SET OF INFRASTRUCTURE RESOURCES ON THE ONE OR MORE INFRASTRUCTURE COMPUTERS

VISUAL DEVOPS SYSTEMS AND METHODS

CROSS REFERENCE TO RELATED APPLICATIONS

This application is a continuation-in-part of U.S. patent application Ser. No. 15/877,262, (now U.S. Pat. No. 10,089,082), filed Jan. 22, 2018, which claims priority to U.S. Provisional Patent Application Ser. No. 62/452,764, filed Jan. 31, 2017, the entirety of each of which are hereby incorporated herein by reference for all purposes.

BACKGROUND

Software products may require substantial infrastructure to operate. For example, when a user interacts with a web application, the behavior of the web application may depend not only upon software executed at the user's computer, but may also depend upon external hardware. Such external hardware may extend the functionality of the user's computer, for example, by providing additional data storage, computational throughput, and/or access to network resources. There are at least two approaches a purveyor of software (e.g., an individual software developer or an organization) may use to provide the infrastructure required to deliver a software product. In a first approach, requisite infrastructure is managed "in-house," by directly configuring physical hardware to provide the infrastructure. For example, if a software product requires additional data storage, the purveyor of software may purchase and physically install a server system including suitable storage devices, and install software to the server system (e.g., a file server program) to provide the required infrastructure. However, this approach requires the purveyor of software to manage every aspect of the infrastructure, including housing physical devices in an appropriate location, managing power usage of the physical devices, installing software to the physical devices, diagnosing problems with the hardware and software, and administering repairs or replacements for failing hardware. These responsibilities may present a large financial and administrative burden to the purveyor of software. Moreover, such "in-house" management may require extensive expertise with hardware and software systems outside of the usual experience of software developers of the software product.

Purveyors of software alternatively may use a second approach in which requisite infrastructure is not managed by the purveyor of software directly. Instead, the purveyor of software may utilize a cloud infrastructure offering from any suitable cloud service provider to provide the needed infrastructure. Non-limiting examples of cloud service providers include AMAZON WEB SERVICES™, GOOGLE COMPUTE PLATFORM™, MICROSOFT AZURE™, VMWARE VCLOUD AIR™, and IBM CLOUD™. Cloud infrastructure offerings allow a purveyor of software to utilize infrastructure such as virtual machines and related resources provided by physical devices, without requiring the purveyor of software to administrate the physical devices "in-house". Instead, the cloud infrastructure offering manages the physical devices and provides the purveyor of software with a means to "provision" infrastructure functionality.

This second approach frees the purveyor of software from some of the burden of managing physical hardware "in-house." However, provisioning infrastructure for a software product may require significant specific expertise with the specific infrastructure being offered by a cloud infrastructure offering. This specific expertise may be outside of the usual experience of software developers of the software product. As such, just as with the first approach, managing infrastructure of a software product may present a significant burden to a purveyor of software.

BRIEF DESCRIPTION OF THE DRAWINGS

FIG. 4 illustrates a computer data structure for representing an architectural flow diagram.

FIG. 5 shows a method for importing a template for configuring infrastructure resources into a visual devops application.

DETAILED DESCRIPTION

Figure 1:
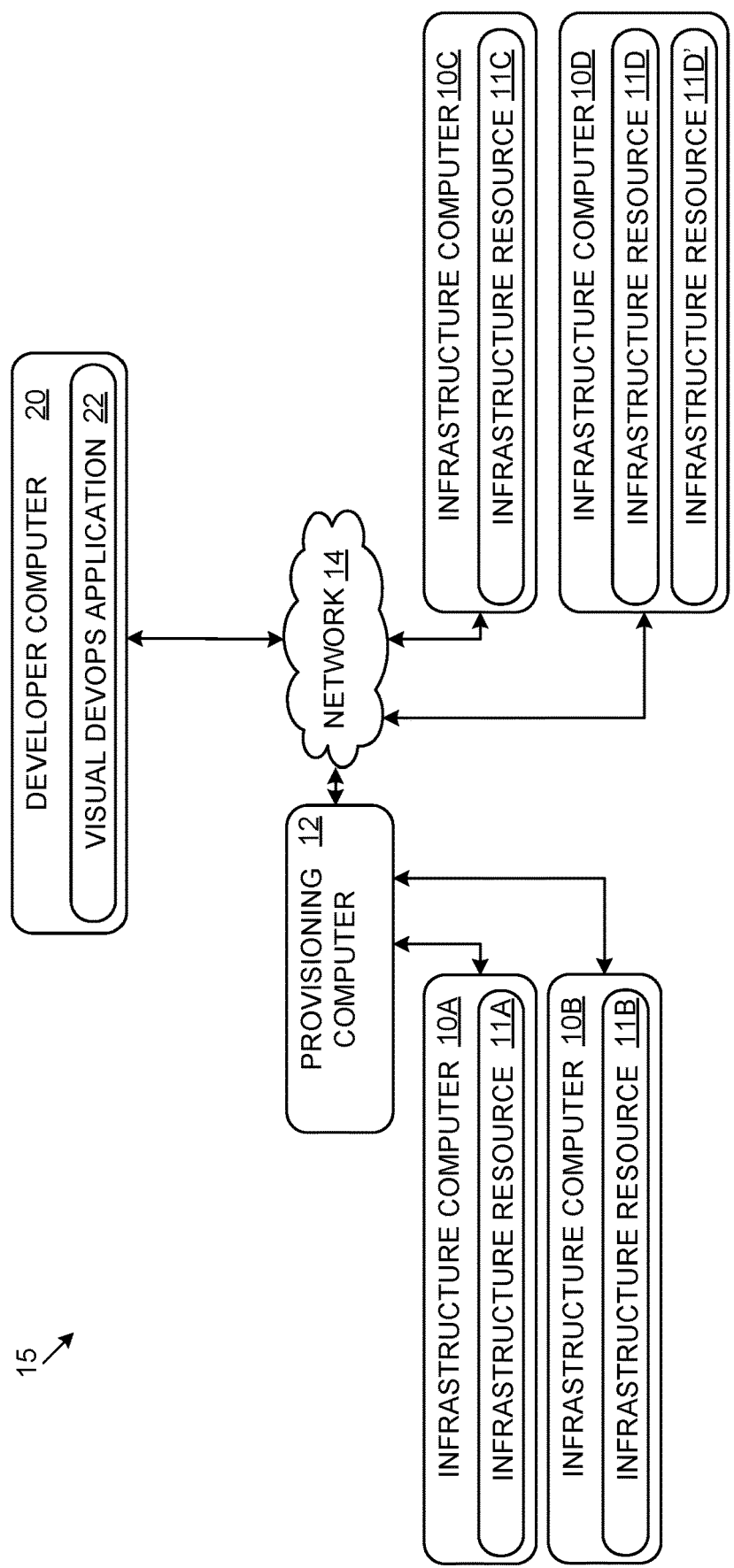
FIG. 1 schematically shows an example computing environment in which a developer computer may execute a visual devops application.

Software product delivery includes a number of activities beyond merely generating code. The software development and delivery lifecycle typically includes planning, development (coding) and testing, release, infrastructure provisioning and configuration, application provisioning and configuration, performance monitoring, and ongoing management. The software developer may coordinate some parts of the software development and delivery lifecycle by using cloud infrastructure (e.g., cloud computing).

However, while cloud infrastructure offerings and infrastructure as code technology may enhance the software development and delivery lifecycle, existing tools for developing a software product via cloud infrastructure focus on explicitly coordinating specific infrastructure resources (e.g., specific physical server devices, or specific virtual infrastructure resources running on a specific physical server cluster). Moreover, such existing tools are tied to specific cloud infrastructure offerings. Thus, in a conventional approach, the software developer must install multiple specialized tools to a development computer and coordinate multiple sources of data pertaining to each cloud infrastructure offering, presenting a fundamental pain point in software development.

Furthermore, a software developer may require extensive knowledge or specific expertise with the specific infrastructure resources being offered. A software developer who lacks such expertise may be at a substantial risk of misconfiguring the infrastructure resources, resulting in impaired functionality of the infrastructure computers offering the infrastructure resources. For example, a developer may arrange to use a set of infrastructure resources which is inadequate to provide the functionality required by a software product. When the set of infrastructure resources is inadequate, the software product may not function at all, may function slowly or inefficiently, or may function for a limited duration before an error results. Furthermore, if the software product functions inefficiently because of a bottleneck created by inadequate infrastructure resources, other infrastructure resources may be underutilized as the overall performance of the software product is limited by the bottleneck.

In another example, the developer may arrange to use a set of infrastructure resources which includes redundant resources, or resources with a capability in excess of what is required by the software product, resulting in underutilization of infrastructure resources. In these examples, the infrastructure computers are inappropriately utilized, as some of them may be stymied by errors or overwhelmed with tasks beyond their capabilities, while others may be underutilized and substantially idle. Furthermore, the misconfiguration of the infrastructure resources may present a large burden to the software developer. Experimenting with new configurations of infrastructure resources may require substantial expertise and time investment. If the software developer fails to detect a misconfiguration in advance and makes the software product available to users, and subsequently the software product experiences errors or reduced performance, user dissatisfaction may result. Furthermore, utilization of infrastructure resources is typically associated with a large financial cost (e.g., paying for the resource at an hourly billing rate set by a cloud infrastructure offering). As such, a misconfiguration which results in underutilization of infrastructure resources, or which is inefficient in its usage of infrastructure resources, may substantially increase a financial burden to develop, test, and deliver the software product. Similarly, developing and testing alternative configurations before delivering the software product (e.g., to avoid or fix a misconfiguration) may substantially increase the financial burden.

The present disclosure is directed to automatically provisioning a plurality of infrastructure resources offered by one or more infrastructure computers. The disclosed approach improves the functionality of the one or more infrastructure computers, by ensuring that they are configured correctly to provide an adequate, non-redundant set of infrastructure resources as required by a software product. Furthermore, the disclosed approach improves upon existing tools and reduces a burden on the software developer by allowing the software developer to design a software product at a high level in terms of the architecture and data flow of the software product.

According to the disclosed approach, a software developer does not need to explicitly coordinate specific infrastructure resources. Instead, the developer designs an architectural flow diagram defining the software product, and the plurality of infrastructure resources are provisioned automatically, based on the architectural flow diagram. Thus, the software developer may be able to develop and deliver a complete software product without installing multiple tools to the development computer and without coordinating multiple sources of data, thereby alleviating the aforementioned fundamental pain point. Moreover, the disclosed approach reduces a need for the software developer to have specific expertise with specific cloud infrastructure offerings, while also reducing a chance of misconfiguring the infrastructure resources. According to the disclosed approach, automatically provisioning the set of infrastructure resources on the one or more infrastructure computers includes automatically determining dependencies of each architectural resource of the software product to ensure that the set of infrastructure resources is adequate to provide all required functionality of the software product. Furthermore, the disclosed approach avoids provisioning redundant infrastructure resources by detecting and removing such redundancies when determining the set of infrastructure resources. By ensuring that an adequate, non-redundant set of infrastructure resources is provisioned, the disclosed approach reduces a chance of misconfiguration of the infrastructure computers. The disclosed approach may ensure that the set of infrastructure resources provisioned on the infrastructure computers is sufficient for the software product, without being substantially underutilized, thereby improving functionality and efficiency of the infrastructure computers. At the same time, the disclosed approach reduces a burden (e.g., in terms of time, expertise, and financial cost) on the software developer.

As described above, a software developer may perform various tasks to coordinate multiple parts of the software development and delivery lifecycle; such tasks may be referred to collectively herein as "devops." FIG. 1 illustrates an exemplary computing environment 15 for devops systems and methods according to the present disclosure. Computing environment 15 includes a developer computer 20 configured to execute a visual devops application 22 (also referred to as a visual architecture design application), as will be described below. Developer computer 20 is communicatively coupled via network 14 to a provisioning computer 12. Network 14 may be any suitable communication network (e.g., the Internet). Provisioning computer 12 is further communicatively coupled to a plurality of infrastructure computers, including direct communicative coupling to infrastructure computers local to provisioning computer 12 (e.g., infrastructure computers 10A and 10B) as well as communicative coupling via network 14 to infrastructure computers remote to provisioning computer 12 (e.g., infrastructure computers 10C and 10D). Each of the infrastructure computers may provide one or more infrastructure resources, which may be physical resources (e.g., disk storage), virtual or logical resources (e.g., utilization of a container instance of a container cluster), as will be further described below. For example, infrastructure computer 10A provides a single infrastructure resource 11A, whereas infrastructure computer 10D provides two different infrastructure resources 11D and 11D'.

The various infrastructure computers may include cloud infrastructure (e.g., infrastructure, services, and/or applications provisioned from an infrastructure provider such as AMAZON WEB SERVICES™ or GOOGLE COMPUTE PLATFORM™ or any other suitable cloud service provider). The infrastructure provider generally provides reconfigurable infrastructure resources drawn from physical machines, virtual machines, and/or networking resources available in underlying physical hardware of the various infrastructure computers, e.g., infrastructure resource 11A of infrastructure computer 10A.

Developer computer 20 executes visual devops application 22, which facilitates deployment, configuration, and/or monitoring of a programming stack in a cloud computing environment. A programming stack is a collection of resources that interoperate together to create a platform for application software. The programming stack may include the infrastructure, networking, services, applications, runtimes, and environment for a particular application. The programming stack may additionally include the particular application designed for the other stack components. Generally, the programming stack in the cloud computing environment is scalable and/or highly available. Visual devops application 22 may be used to define a stack for deploying applications and/or services, and/or may be used to deploy, configure, and/or monitor user-developed applications and/or services in conjunction with the programming stack (additionally or alternatively, the user-developed applications and/or services may be part of the stack).

The developer computer 20 is configured to execute a visual devops application 22 that is an interactive tool to design a software architectural flow diagram 50 (shown in FIG. 3) that describes and/or defines the programming stack.

The architectural flow diagram 50 describes and/or defines the process dataflow that is realized (e.g., deployed, configured, and/or monitored) with the visual devops application 22. By focusing on the application and stack architecture design, and the corresponding dataflow, the visual devops application 22 permits software product delivery teams to design according to the application needs versus infrastructure needs (e.g., application-centric and/or dataflow-centric design in place of infrastructure-centric design). For example, software product delivery stages such as development and testing, product release, infrastructure provisioning and configuration, and application provisioning and configuration may be managed according to functional requirements of the software product. However, the visual devops application 22 is not necessarily limited to application-centric and/or dataflow-centric design. The visual devops application 22 may provide for architecture design based on infrastructure resources and/or raw infrastructure resources (such as raw infrastructure resource elements provided by the cloud and/or other infrastructure provider, e.g., AMAZON EC2™ instances from AMAZON WEB SERVICES™, GOOGLE APP ENGINE™ instances, LINODE™ servers, Internet APIs, etc.).

The visual devops application 22 may alleviate a fundamental pain-point in application development, e.g., designing infrastructure to achieve successful application deployment. Traditional methods of deploying and managing infrastructure may take considerable time and expertise, and potentially specific expertise with the particular features offered by a chosen cloud infrastructure provider. Use of the visual devops application 22 may provide a method to reduce the time (and/or detailed knowledge of infrastructure provisioning and deployment needed) to successfully produce a reliable stack, in particular for a scalable and/or highly available cloud computing environment.

The visual devops application 22 may serve as an abstraction layer on top of cloud infrastructure providers like AMAZON WEB SERVICES™, GOOGLE COMPUTE PLATFORM™, and/or any other suitable cloud service provider(s). In this manner, the developer computer 20 may provide cross service compatibility and/or may translate the infrastructure resources available from a cloud infrastructure provider into architectural resources available for application-centric and/or dataflow-centric design. Furthermore, the visual devops application 22 may translate a specification defined in terms of architectural resources (e.g., an architectural flow diagram) into infrastructure resources to implement the architectural resources.

Infrastructure resources include any suitable computer services. Computer services include software and/or hardware products configured to transform/process data, actuate real-world processes, communicate with other computer services, etc. Computer services may be implemented by one or more hardware devices which may be accessible over computer networks to orchestrate behavior of multiple computer services, e.g., Internet servers, computer clusters, etc. Non-limiting examples of computer services include computer services made available by cloud service providers, other networked computer services (e.g., an Internet server), and other low-level computing resources that are made available via communication protocols (e.g., TCP/IP), APIs, etc.

Numerous and various infrastructure resources can be orchestrated to create novel computer services, e.g., new web applications, new APIs, new multimedia products, new real-world services, etc. However, infrastructure resources are typically only controllable via specific and limited protocols, e.g., a particular infrastructure resource provided by a particular cloud service provider may only be controllable according to a cloud-provider specific API, or a typical API made available on the Internet may have non-standard conventions differing from other APIs. In many cases, various infrastructure resources may provide similar functionality but may only be controllable according to unrelated, different protocols.

Accordingly, developers of computer services may face a burden to understand different infrastructure resources, and to write interoperability ("glue") code to link different computer services. In some cases, a large software product may require many different modules which may be developed by many different team members. Accordingly, when working with infrastructure resources, different teams may be required to learn different conventions corresponding to different infrastructure resources. Developing different modules based on different infrastructure resources may accordingly present a further burden to efficient inter-team communication, e.g., for ensuring that the modules interoperate smoothly.

A devops application according to the present disclosure allows a developer to design a computer service in terms of architecture resources, thereby alleviating the aforementioned burdens associated with infrastructure resources. An architecture resource represents a component of a computer service at any suitable level of abstraction at which a developer may wish to specify the relevant functionality of the component. For example, architectural resources may be specified in terms of application-specific behavior of a component (e.g., application-centric design) and/or dataflow of inputs and/or outputs of a component (e.g., dataflow-centric design).

The visual devops application automatically determines interoperability (e.g., "glue code") for architectural resources by automatically ensuring compatibility between different data types, file formats, protocols, etc., alleviating a burden on the developer to explicitly design and/or specify such interoperability. Accordingly, compared to working with raw infrastructure resources, a developer using the visual devops application may more efficiently spend time/effort on the design and implementation of relevant aspects of a computer service, e.g., instead of spending time/effort writing interoperability code. Although some architectural resources may only be interoperable with particular other architectural resources (e.g., based on datatype, number, and/or semantic intent of input/output parameters, etc.), the visual devops application is configured to automatically determine interoperability behavior to link together inputs/outputs of architectural resources to orchestrate control flow and/or dataflow of a computer service without requiring the developer to write any compatibility code The visual devops application enables designing a computer service in terms of architecture resources without regard to particular details of interoperating different computers. The devops application implements an architectural design expressed in terms of architecture resources, by provisioning suitable infrastructure resources which provide the relevant functionality of the architectural resources.

In some examples, the visual devops application implements an architectural resource using a combination of a plurality of infrastructure resources (e.g., "lower-level" resources). For example, the visual devops application is configured to implement an architecture resource by orchestrating various infrastructure resources to provide a particular high-level behavior or data-flow.

In some examples, the visual devops application is configured to select from a variety of different alternative choices of infrastructure resource(s) to implement an architectural resource. For example, the visual devops application is configured to implement a particular type of architectural resource (e.g., key-value store) via a particular type of infrastructure resource (e.g., database server) which may be provided by a plurality of different cloud service providers and/or Internet servers. As such, the architectural resource may be provider-agnostic; although in certain scenarios, a specific provider may be specified.

In some examples, the visual devops application is configured to implement an architectural resource using a selection from one or a limited number of specific infrastructure resources, e.g., infrastructure resources from a specific service provider. Although the visual devops application is configured to implement the architectural resource using the specific infrastructure resource(s), the visual devops application may nevertheless abstract aspects of configuring the infrastructure resource(s) (e.g., by automating aspects of configuration, selecting predefined default/constant configuration settings, etc.). Because the visual devops application allows developers to configure architectural resource at a suitable level of abstraction which emphasizes relevant details of the architectural resource, developers may ignore irrelevant details, more readily understand relevant details, etc.

In some examples, the visual devops application is configured to implement an architectural resource with a specific combination of provider-specific infrastructure resources (e.g., a combination of infrastructure resources of one service provider, a combination including an infrastructure resource from each of several different service providers, etc.). Accordingly, the visual devops application may allow configuration of the architectural resource at a suitable level of abstraction which hides internal details of the combination of infrastructure resources. Accordingly, by using the visual devops application, developers may ignore internal details of the combination of infrastructure resource and more readily understand relevant details of the overall behavior of the combination.

In some examples, the visual devops application is configured to recognize an architectural relationship between a plurality of architectural resources which may inform (e.g., constrain, optimize, etc.) an implementation in terms of infrastructure resources. For example, the visual devops application may recognize that a possible implementation of plurality of architectural resources may redundantly include multiple instances of a particular infrastructure resource. Alternately or additionally, the visual devops application is configured to recognize that the plurality of architectural resources may be able to better function if an additional infrastructure resource is included (e.g., to facilitate communication among the plurality of architectural resources). In some examples, the visual devops application is configured to implement a plurality of different architectural resources (e.g., components of dataflow of a software application) by configuring a single infrastructure resource (e.g., a single server) to provide the collective functionality of the architectural resources.

Accordingly, the visual devops application may allow an architectural design in which architectural resources and infrastructure resources are not in a 1:1 relationship. As described above, using the visual devops application, architectural resources may be in a 1:N relationship (e.g., wherein 1 architectural resource is implemented by a combination of N different infrastructure resources), an M:1 relationship (e.g., wherein M different architectural resources may be implemented by a single infrastructure resource), and/or any suitable M:N relationship (e.g., wherein M different architectural resources may be implemented by N different infrastructure resources, with each different architectural resource being implemented by any suitable combination of the N different infrastructure resources).

The present disclosure includes numerous, non-limiting examples of architecture resources which will be described in further detail below. The visual devops application may be extended to handle any other state-of-the-art and/or future component of a computer service. The visual devops application may implement the architectural resource using infrastructure resources that provide the architectural resource's application-specific behavior and/or dataflow, in similar fashion to the implementation strategies described for the exemplary architectural resources in the present disclosure.

With the visual devops application 22 and using application-centric and/or dataflow-centric design, developers may work with familiar components like microservices, container services (e.g., DOCKER™ services, as will be further described below), virtual networks, and load balancers. The visual devops application 22 may handle the logistics of implementing the architectural resources, by suitably configuring the raw infrastructure resources (e.g., as provided by the cloud infrastructure provider). The visual devops application 22 may further handle the logistics of keeping the raw infrastructure resources connected, secure, and healthy.

Hence, the visual devops application 22 may provide one or more key features such as (1) visual design of architectural and/or infrastructure resources for a software product (potentially no coding is required to provide the appropriate infrastructure resource), (2) cross services compatibility (permitting abstraction from particular cloud infrastructure providers and/or avoiding the lock-in effect of reliance on proprietary solutions), and/or (3) design, deployment, monitoring, and/or management of infrastructure resources from an application-centric and/or a dataflow-centric perspective.

Figure 2:
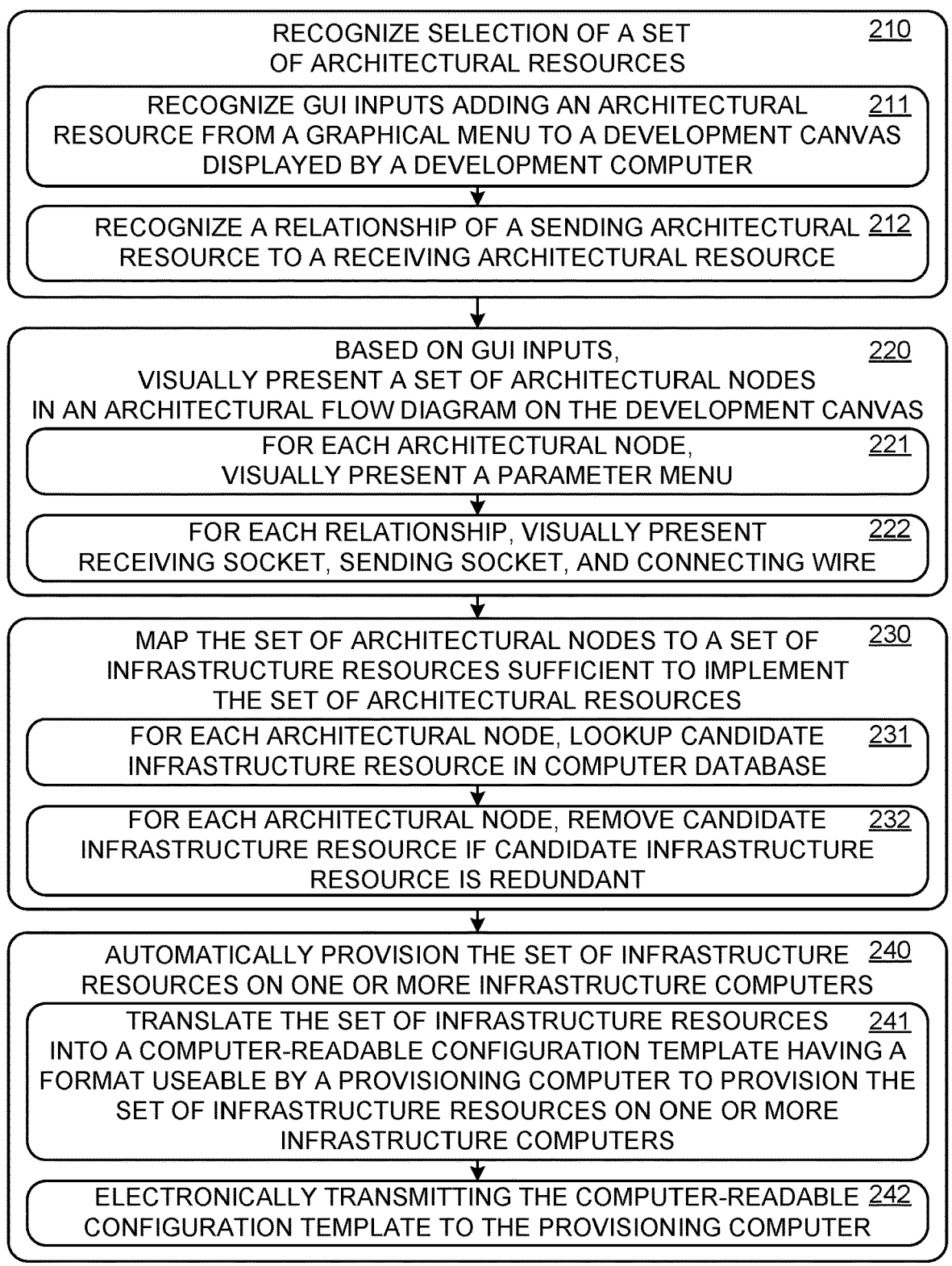
FIG. 2 shows a method for provisioning a plurality of infrastructure resources on one or more infrastructure computers.

Accordingly, FIG. 2 shows a method 200 of provisioning a plurality of infrastructure resources offered by one or more infrastructure computers, based on an architectural flow diagram created using the visual devops application. Method 200 is capable of provisioning infrastructure resources in a non 1:1 manner relative to architectural resources (e.g., in any suitable M:N relationship). For example, a single architectural resource may require two or more infrastructure resources to implement, and method 200 may automatically provision all such infrastructure resources.

Method 200 includes, at 210, recognizing selection of a set of architectural resources. In an example, recognizing selection of the set of architectural resources may include, at 211, visually presenting a graphical menu of selectable architectural resources and recognizing graphical user interface (GUI) inputs adding an architectural resource from the graphical menu to a development canvas displayed by a development computer (e.g., a development canvas of visual devops application 22 displayed via a display device of development computer 20, as shown in FIG. 1). In an example, recognizing selection of the set of architectural resources may include recognizing a user selection of one or more computer-readable files that define a selection of architectural resources (e.g., a computer-readable configuration template associated with a cloud service provider, and/or a source code repository including one or more such templates). For example, the user interface inputs may indicate the set of architectural resources by indicating a specific template file and/or repository to load, e.g., to resume working on saved progress of an architectural design derived from the template/repository. Accordingly, recognizing selection of the set of architectural resources may include loading the computer-readable file(s) automatically displaying the architectural design as an interactive architectural flow diagram and/or an interactive command-line interface. In an example, a repository includes a plurality of computer-readable configuration templates. Accordingly, recognizing selection of the set of architectural resources includes scanning the repository to access the plurality of computer-readable configuration templates, and recognizing architectural resources based on any subset of the plurality of computer-readable configuration templates (e.g., based on one template, two templates, or any other suitable number of templates such as all of the templates defined in the repository).

Figure 3:
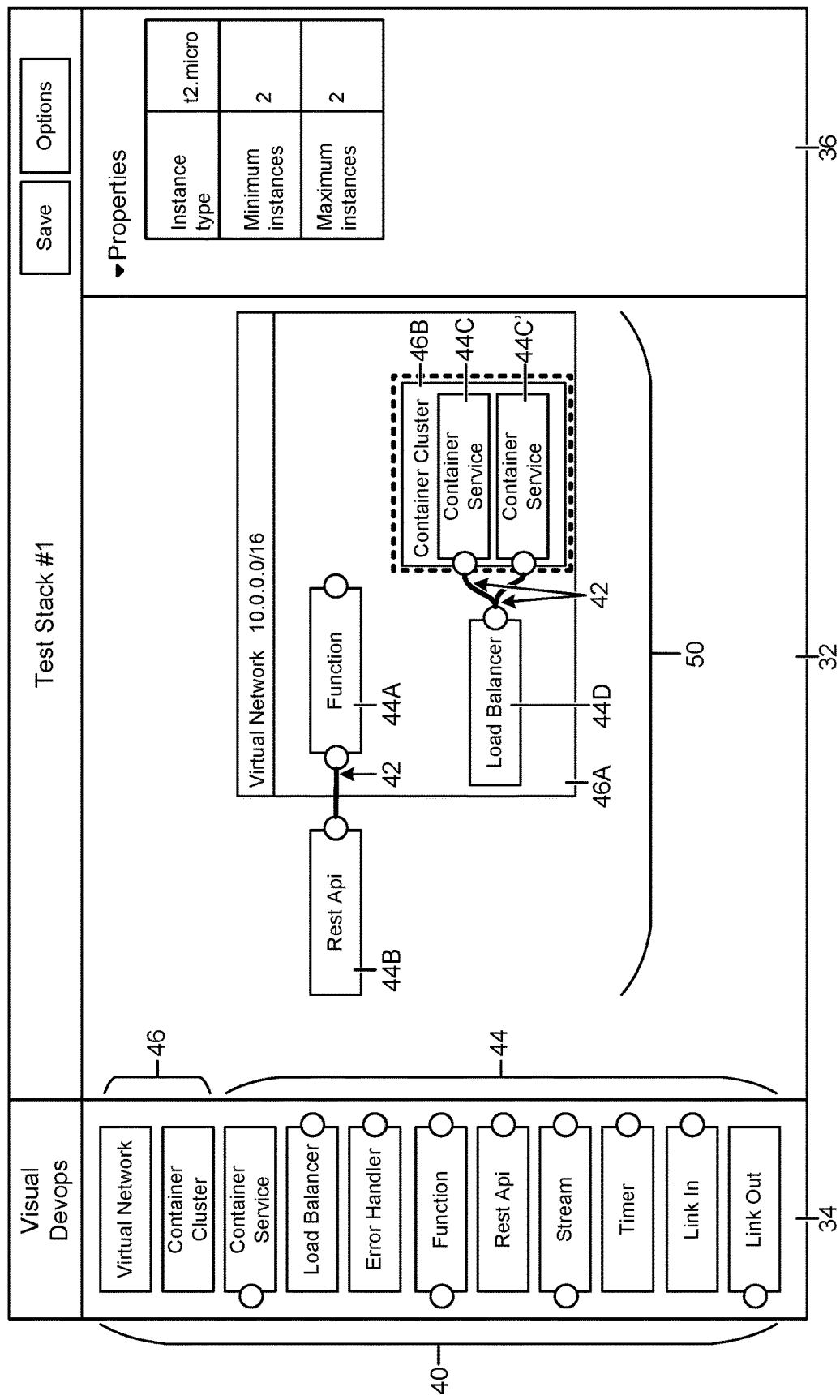
FIG. 3 shows a graphical user interface of a visual devops application including a development canvas usable to design an architectural flow diagram.

FIG. 3 shows a view of a GUI 30 of an exemplary visual devops application (e.g., visual devops application 22) which may be executed on a developer computer as described above with reference to FIG. 1. In the example, the set of architectural resources may be selected by a software developer by dragging architectural resources from the graphical menu to the development canvas. In another example, suitable GUI inputs may include keyboard hotkeys (e.g., press 'f' to insert a new function node 44A into development canvas 32), contextual menus or modal interactions (e.g., right click to bring up a dialog for picking an architectural resource). Alternately or additionally, the selection of the set of architectural resources may be recognized automatically in any suitable manner.

Visual devops application 22 is configured and/or programmed for visual design of the architectural resources for a software product via the GUI 30. GUI 30 includes a top bar including an application title (shown as "Visual Devops"), a title for the current project (shown as "Test Stack #1"), and other interface elements such as a "Save" and "Options" button. GUI 30 further includes a development canvas 32 to place and arrange nodes to design an application as an architectural flow diagram 50. Architectural flow diagram 50 includes a set of architectural nodes selected from available architectural nodes 40 as displayed in node toolbar 34. Node toolbar 34 may display all types of nodes, frequently used types of nodes, or any other suitable set of available nodes. Nodes 40 include scope nodes 46 and operational nodes 44. Each of the nodes 40 of the node toolbar 34 represent functions to be implemented after the corresponding node 40 is placed on the development canvas 32. The nodes 40 are implemented in infrastructure according to the architecture design arranged on the development canvas 32. Settings of the implementation of the particular nodes 40 may be edited with a properties menu 36 (which may be displayed as a pane, toolbar, or dialog in the graphical user interface 30). The graphical user interface 30 may include toolbars or other devices for selecting elements and/or operation modes. Generally, the graphical user interface 30 is a point-and-click interface and may include features such as drag and drop, copy and paste, resize, and/or undo. Graphical user interface 30 may allow inspection of a particular node 40 (e.g., by clicking on the particular node), as with selected Container Cluster node 46B with selection indicated by a dotted outline.

Nodes 40 generally are architectural resources and generally interconnect by representing relationships between nodes in the architectural flow diagram 50 as connecting wires 42 that indicate message flow between nodes 40. Some nodes 40 may visually contain other nodes 40. Nodes 40 that may contain other nodes may be referred to as scope nodes 46. Other nodes 40 may be referred to as operational nodes 44 (also called functional nodes and/or ordinary nodes). Scope nodes 46 define a scope (e.g., limited execution zone that may limit where and/or how a contained node 40 may execute and/or may be accessed). A Virtual Network node 46A is an example of a scope node 46. The virtual network node 46A includes an Internet Protocol (IP) address (e.g., "10.0.0.0/16") specifying a virtual IP associated with the virtual network. Nodes 40 within Virtual Network node 46A may be accessed only within the network or by edge connections in the network. Operational nodes 44 typically represent architectural resources. Operational nodes that represent architectural resources may be referred to herein as "architectural nodes." In the example of FIG. 3, a Function node 44A (which is an operational node 44) is within the Virtual Network node 46A. The Function node 44A is accessible from outside the Virtual Network node 46A via the Rest Api node 44B (which is an operational node 44). Additionally, in the example of FIG. 3, a second scope node 46, namely Container Cluster node 46B is contained within the Virtual Network node 46A. The Container Cluster node 46B includes two operational nodes 44, namely two Container service nodes 44C and 44C'. The Container service nodes 44C and 44C' of the Container Cluster node 46B may be accessed from outside the Virtual Network node 46A via a Load Balancer node 44D (which is an operational node 44). In other examples, in addition to architectural nodes, the operational nodes available for selection may include operational nodes that represent raw infrastructure resources.

In the application represented by the architectural flow diagram 50, internal messages are transferred between nodes 40 according to the routing of connecting wires 42 connected to the nodes 40. Generally, internal messages travel downstream (from left to right in FIG. 3). Inputs of the nodes 40 are generally on the upstream side (left in FIG. 3) of nodes 40 and outputs are generally on the downstream side (right in FIG. 3). Connecting wires 42 may represent message flow from upstream to downstream, message flow from downstream to upstream, and/or bidirectional message flow. Regardless of whether message flow is directional, nodes 40 may be referred to as having a "sending" socket, represented by a circle on the downstream (right) side of the node 40 and a "receiving" socket, represented by a circle on the upstream (left) side of the node 40. Similarly, when a connecting wire 42 visually connects a sending socket of a first node to a receiving socket of a second node, the first node may be referred to as a sending node and the second node may be referred to as a receiving node. For example, in the relationship represented by Rest Api node 44B and function node 44A, Rest Api node 44B is the sending node and function node 44A is the receiving node.

Method 200 further includes, at 212, recognizing one or more relationships between architectural resources, where each relationship relates a sending architectural resource to a receiving architectural resource. Recognizing a relationship of a sending architectural resource to a receiving architectural resource may include recognizing a relationship defined by a connecting wire visually connecting a sending socket of the sending architectural resource to a receiving socket of the receiving architectural resource. Furthermore, recognizing the relationship may include recognizing GUI inputs forming the connection via the connection wire. For example, with reference to FIG. 3, if a user of visual devops application 22 places a first node 40 on the development canvas 32, clicks on the sending socket of the node 40, and drags the mouse to a receiving socket of a second node 40, visual devops application 22 may recognize the input to indicate a relationship between the first node and the second node, in which the first node is the sending node and the second node is the receiving node.

Returning to FIG. 2, method 200 further includes, at 220, based on GUI inputs received at the development computer, visually presenting the selected set of architectural nodes in an architectural flow diagram on the development canvas. For example, FIG. 3 shows an architectural flow diagram 50 including two different scope nodes 46 and five different operational nodes 44, as described above.

Visually presenting the architectural flow diagram includes at 221, for each architectural node in the architectural flow diagram, visually presenting a parameter menu defining parameters of the architectural node. For example, as shown in FIG. 3, GUI 30 may include a properties menu 36 including parameters of an architectural node selected for inspection, as with properties menu 36 showing parameters of the selected Container Cluster node 46B.

Visually presenting the set of architectural nodes may further include visually presenting a scope node visually containing one or more other architectural nodes. For example, FIG. 3 shows two different examples of scope nodes. The first scope node is a virtual network node 46A containing function node 44A, load balancer node 44D, and another scope node, Container Cluster node 46B. The second scope node, Container Cluster node 46B contains two container service nodes 44C and 44C'.

Returning to FIG. 2, visually presenting the architectural flow diagram further includes, at 222, for each relationship between a sending architectural resource and a receiving architectural resource, visually presenting a receiving socket, sending socket, and connecting wire visually connecting the sending socket to the receiving socket, as described above and as shown by the connecting wires 42 in FIG. 3.

Furthermore, after visually presenting the architectural flow diagram at 220 based on the GUI inputs, method 200 optionally may include returning to 210 to further modify the architectural flow diagram, e.g., by recognizing selection of a different set of architectural resources based on GUI inputs adding or deleting an architectural resource to/from the development canvas. Based on the visual feedback of the architectural flow diagram, a software developer may design an architectural flow diagram incrementally/iteratively, adding/removing nodes and relationships to obtain a desired design.

In some examples, the set of nodes contained in the architectural flow diagram may be represented as a multi-element computer data structure (e.g., an array or matrix data structure), which may be used as an intermediate representation of the architectural flow diagram (e.g., for storage or for transmission over a computer network). The multi-element computer data structure may include an element for each architectural node in the architectural flow diagram. Each element includes a description of an architectural resource represented by an architectural node corresponding to the element, and a listing of ports connecting the architectural node corresponding to the element with other architectural nodes of the architectural flow diagram. For example, FIG. 4 shows a tabular representation of a multi-element computer data structure 60 corresponding to the architectural flow diagram 50 shown in FIG. 3. The multi-element computer data structure 60 includes an array of seven elements, one for each node 40 in the architectural flow diagram (including operational nodes 44A-D and scope nodes 46A-B). Each of the elements includes a sequential serial number 61, which is used to uniquely identify the element. When used, a sequential serial number may be determined in any suitable fashion, e.g., based on an order in which architectural nodes were added to the development canvas by the software developer. Each of the elements further includes a node type 62 describing the type of operational or scope node corresponding to the element, e.g. "RestApi" describing a Rest Api node (e.g., Rest Api node 44B) and "LoadBal" describing a load balancer node (e.g., load balancer node 44D). Each of the elements further includes a "Contains" datum 63 indicating whether the architectural node corresponding to the element is a scope node containing any other nodes, and a "ContainedBy" datum 64 indicating whether the architectural node corresponding to the element is contained within a scope node by indicating the serial number of the scope node (as shown in the serial number column 61 for the element corresponding to the scope node). Note that the "Contains" and "ContainedBy" data as depicted herein indicate only direct containment, e.g., the "Contains" and "ContainedBy" data indicate that container service nodes 44C and 44C' are contained directly within container cluster 46B, but are not denoted as being contained directly within virtual network node 46A. Similarly, virtual network node 46A contains function node 44A, load balancer node 44D, and Container Cluster node 46B, but does not directly contain container service nodes 44D.

Although FIG. 3 shows an architectural flow diagram as part of a graphical tool including a graphical user interface in the form of a development canvas, a visual devops application according to the present disclosure may present an architectural flow diagram in any suitable manner that allows accessing and/or modifying architectural nodes representing architectural resources.

As a non-limiting example of an alternative or additional approach to the GUI shown in FIG. 3, the visual devops application may present an architectural flow diagram in the form of an interactive command-line tool. A tool according to the methods of the present disclosure (e.g., command line tool or any other tool for working with architectural flow diagrams) may display architectural resources of the architectural flow diagram in any suitable arrangement, e.g., as a listing by architectural resource type. The tool may support various context-dependent interactive commands when viewing an architectural flow diagram, architectural node, and/or infrastructure resource configuration. The tool may provide search, sort, and/or filter commands to access particular architectural resources, e.g., based on names, types, and/or any other suitable details of the architectural resources.

The tool may include an interpreter for a scriptable command language for navigating to different contexts of an architectural flow diagram and/or executing context-dependent commands with regard to a current context. Accordingly, the tool may execute scripts in the command language to automate aspects of development using the tool.

Although examples may be described in terms of a visual devops application (e.g., a tool with a GUI as shown in FIG. 3 such as visual devops application 22), the development processes enabled by the present disclosure are not so limited, and may be similarly implemented in a command line tool, etc. Similarly, scripting of a tool using a context-dependent command language may be included as functionality of a visual devops application, e.g., in the form of a command-line scripting pane of visual devops application 22.

The tool may further allow high-level commands for working with architectural flow diagrams, e.g., importing an architectural flow diagram from one or more configuration templates, saving the architectural flow diagram as a configuration template, provisioning the architectural flow diagram with a set of infrastructure resource on one or more infrastructure computers, monitoring the provisioned implementation, etc., according to any of the methods described herein.

The command-line tool for accessing an architectural flow diagram may present a text-based, interactive view of substantially the same information as the graphical diagram of FIG. 3 for an architectural node, e.g., showing relevant information of the architectural resource and abstracting away from irrelevant information (e.g., infrastructure configuration details).

The architectural flow diagram may track a current context indicating a particular architectural node being inspected. While focusing on an architectural node, the command-line/script interpreter may support context-dependent commands including a command to view configuration details for one or more infrastructure resources associated with an implementation of the architecture node. While focusing on an architectural node, the context-dependent commands may further include a command to display monitoring information for the node, delete the node, modify the node, add a new connection or containment relationship (e.g., to an existing or new node), and any other suitable commands to access information regarding the node. Accordingly, the tool may recognize changes to the architectural flow diagram based on interpreting commands with regard to the architectural node being inspected.

The architectural flow diagram may represent the diagrammatic relationships, e.g., wires and containment, between architectural nodes, in any suitable manner. As a non-limiting example, the tool may recognize, for each architectural resource, an associated address (e.g., an automatically generated identifier) and accordingly recognize a wire between a first architectural node and a second architectural node based on the associated addresses. Accordingly, the context-dependent interactive commands available when viewing the first architectural node may include a command to view linked nodes including the second architectural node, e.g., in "view output dataflow" and "view input dataflow" commands. Containment relationships may be recognized by the visual devops application in a similar fashion, e.g. in "view containing node" and "view contained nodes" commands.

Returning to FIG. 4, each of the elements further includes a port mapping 65, indicating "downstream" nodes which are receiving nodes in a relationship with the sending node corresponding to the element. The port mapping 65 for an element includes a set of pairs of node serial numbers (e.g., referring to the serial numbers shown in column 61) and port numbers, each of which may be any suitable port number for configuring networked communication between the architectural resources represented by the related nodes. For example, in FIG. 4, the port mapping for the "RestApi" node with serial number 1 (corresponding to Rest Api node 44B of FIG. 3) includes a connection to the "Function" node with serial number 2 via two different ports, 332 and 333. The port mapping for the "LoadBal" node with serial number 4 (corresponding to the load balancer node 44D of FIG. 3) includes a connection to the "ContServ" node with serial number 6 via port 42, and a connection to the other "ContServ" node with serial number 7 via two ports, 51 and 52. Port numbers may be determined in any suitable fashion, e.g., automatically by assigning port numbers out of a pool of available port numbers, or manually based on parameters of a node (e.g., as set using properties menu 36 as shown in FIG. 3). In addition to tabular data structures as described herein, the set of nodes contained in the architectural flow diagram may be represented by any other suitable multi-element data structure, for example, by a tree structure represented in computer memory by data linked via pointers. It will be appreciated that containment of nodes or relationships between nodes may be represented in any other suitable fashion, for example, in some cases the "ContainedBy" field may be omitted and containment relationships may be inferred completely based on the "Contains" field.

Returning to FIG. 2, method 200 further includes, at 230, mapping the set of architectural nodes to a set of infrastructure resources (e.g., raw infrastructure resources as available from a cloud infrastructure provider) sufficient to implement the set of architectural resources represented by the architectural nodes in the architectural flow diagram. Mapping the set of architectural nodes to a set of infrastructure resources may be performed at any suitable time (e.g., with reference to FIG. 3, mapping the set of architectural nodes to the set of infrastructure resources may be performed after the software developer uses the "Save" button to finalize their changes to the architectural flow diagram). Mapping the set of architectural resources to the set of infrastructure resources may be based on the multi-element data structure representing the architectural flow diagram as described above with reference to FIG. 4, or based on any other suitable representation of the architectural flow diagram (e.g., based on a runtime state of the visual devops application including data defining the contents of the development canvas). The set of infrastructure resources may include various resources provided by various infrastructure computers (e.g., resources provided by the infrastructure computers shown in FIG. 1) and as further described below with regard to the various node types representing various available architectural resources.

Mapping the set of architectural nodes to the set of infrastructure resources includes, at 231, for each architectural node, looking up a candidate infrastructure resource in a computer database. The computer database may be local to the development computer, provided by a provisioning computer, and/or stored and made available at any suitable location (e.g., archived on one or more of the infrastructure computers). The computer database may include cloud provider resources of one or more providers, as well as other infrastructure resources (e.g., including individual physical hardware resources, such as a server local to the development computer). Mapping the set of architectural resources to a set of infrastructure resources may be agnostic to particular infrastructure resources, so that a particular architectural resource may be implemented according to a plurality of different approaches that may use different infrastructure resources. For example, as will be described in more detail below, a function node may be implemented in various ways, including 1) via a script (e.g., using the AMAZON LAMBDA™ service of AMAZON WEB SERVICES™, GOOGLE CLOUD FUNCTIONS™, AZURE FUNCTIONS™, etc.) or alternately 2) via a virtual machine. In an example, method 200 may determine the particular set of infrastructure resources to implement an architectural resource based on parameters of the architectural resource set in the properties menu (e.g., properties menu 36 showing properties of the selected Container Cluster node 46B as shown in FIG. 3). Alternately, method 200 may determine the particular set of infrastructure resources in any suitable fashion, for example, by automatically selecting from among a plurality of candidate infrastructure resources based on a predefined user preference indicating a preferred infrastructure resource for an architectural resource based on the node type of the architectural node representing the architectural resource.

As used herein, implementing an architectural resource may require one or more infrastructure resources that are configured and/or programmed to perform a particular task (as defined by the visual devops application 22 and/or the user). Examples of architectural resources include a Rest Api (representational state transfer application programming interface, also referred to as REST API), a service, an independent function (e.g., as performed by a script using the AMAZON LAMBDA™ service of AMAZON WEB SERVICES™ or any other suitable service for script infrastructure resources), a microservice, a container service, a data stream, a database, a virtual network, a load balancer, a container cluster, and a distributed storage and processing cluster (e.g., APACHE HADOOP™. For example, a container cluster resource may require at least two different infrastructure resources (e.g., two or more different computers configured to form the container cluster) to implement. A particular container cluster resource may be mapped to potentially different configurations of infrastructure resources running on different infrastructure computers. For example, the infrastructure computers used to implement the cluster may be selected based on how many container services will be run on the cluster. In another example, the infrastructure computers may be selected based on a software/hardware configuration required by one of the container services (and provided by at least one available infrastructure computer which may be configured to participate in the cluster). Therefore, mapping the set of architectural nodes to a set of infrastructure resources may include, for a particular architectural node, looking up a first candidate infrastructure resource in the computer database, and if the first candidate infrastructure resource is not sufficient to fully implement the architectural resource, looking up additional infrastructure resources in the computer database.

In some cases, two or more architectural resources may redundantly require a common infrastructure resource to be included in the set of infrastructure resources. For example, each of the two container service nodes 44C and 44C' in FIG. 3 may require a particular software environment to be available on the container cluster 46B on which they are implemented. When mapping the first container service node 44C to one or more infrastructure resources, the visual devops application may determine that the set of infrastructure resources should include at least a candidate infrastructure resource representing a container cluster configured to provide the particular software environment. Similarly, when mapping the second container service node 44C' to one or more infrastructure resources, the visual devops application may redundantly determine that the set of infrastructure resources should include the same candidate resource. Because the two container services 44C and 44C' are to be implemented on a single container cluster 46B, the candidate infrastructure resource may be shared by the two container services and should not be provisioned twice. Accordingly, mapping the set of architectural nodes to a set of infrastructure resources further includes, at 232, removing one or more candidate infrastructure resources if they are redundant to other infrastructure resources.

Furthermore, the visual devops application may determine the mapping from an architectural resource to one or more infrastructure resources based on whether the architectural resource is contained within a scope node. In the above example, because the container service nodes 44C and 44C' are contained within a single container cluster 46B, the corresponding infrastructure resources may be selected and/or configured to ensure that the two container services 44C and 44C' are implemented in a mutually compatible way via infrastructure resources providing hardware and software of container cluster 46B. Accordingly, for this example, mapping the set of architectural nodes to the set of infrastructure resources includes mapping the Container Cluster node to a container cluster infrastructure resource, and for each architectural node within the Container Cluster node, mapping the architectural node to a container instance implemented by the container cluster infrastructure resource. In another example, also shown in FIG. 3, the virtual network node 46A includes several other nodes (e.g., function node 44A, load balancer node 44D, and the container cluster 46B). The infrastructure resources of each contained node should be configured according to an internal network policy of the virtual network. Accordingly, mapping the set of architectural nodes to the set of infrastructure resources includes, for each architectural node within the virtual network node, mapping the architectural node to one or more infrastructure resources and configuring a network policy of the one or more infrastructure resources based on the virtual network node. For example, such configuration could include configuring software of the one or more infrastructure resources to implement virtual switches, routing tables, and subnetworks that logically divide a physical communication network to provide the virtual network. Alternately, a virtual network may be provided in the form of virtualized or logical resources operating on a hypervisor or container cluster. For example, when the virtual network is implemented in the form of logical resources (e.g., container services) running on a container cluster, mapping the set of architectural nodes to a set of infrastructure resources may be handled similarly to the approach for Container Cluster nodes, as described above.

In an example, the architectural flow diagram 50 shown in FIG. 3 may be mapped to a set of infrastructure resources including physical resources such as: 1) a physical computer server providing a Rest Api resource defined by Rest Api node 44B; 2) an AMAZON LAMBDA™ service resource providing functionality defined by function node 44A; 3) a load balancer resource comprising a physical load balancer device; and 4) a container cluster resource capable of marshalling one or more container services, comprising five physical infrastructure resources (e.g., computers participating in the cluster) and a logical resource (e.g., a DOCKER™ software instance configuring the five physical infrastructure resources). In this example, service 44C' may be mapped to two infrastructure resources including 5) a logical resource representing a container service providing NODE.JS™ runtime environment and 6) another logical resource representing a Java runtime environment. In the same example, container service node 44C may be mapped to an infrastructure resource representing a container service providing a NODE.JS™ runtime environment. In this case, both container services require the NODE.JS™ runtime environment, so initially, each architectural resource corresponding to the two container services is mapped to a separate infrastructure resource indicating the necessity of the NODE.JS™ runtime environment (e.g., requiring that the container cluster used to implement the container services provides the NODE.JS™ runtime environment in the form of an executable binary file and/or software library). However, since both container services will be implemented on the same container (e.g., as defined by Container Cluster node 46B), both container services will be able to share a single implementation of the NODE.JS™ runtime environment. For example, when the container cluster is implemented via a DOCKER™ software instance, NODE.JS™ can be made available to all container services of the DOCKER™ instance by installing the relevant executable binary files and/or software libraries once and configuring the DOCKER™ software instance to make such installed files accessible globally to all DOCKER™ services running on the cluster. As such, after mapping the set of architectural nodes to a set of infrastructure resources, and removing redundant resources, the set of infrastructure resources will include all of the infrastructure resources mentioned in points 1-6 above, without including the redundant NODE.JS™ logical resource more than once.

It will be appreciated that the mapping between architectural nodes and infrastructure resources is not a one-to-one mapping, since a single architectural node may require more than one infrastructure resource to implement, and since more than one architectural node may be redundantly mapped to the same infrastructure resource.

As a nonlimiting example, an Automatically-Scaling Table Node may require four different infrastructure resources to implement. An Automatically-Scaling Table Node represents an architectural resource providing access to data stored in a table (e.g., a database). A software developer may wish to use an Automatically-Scaling Table Node that scales to accommodate a variable data capacity. For example, a scaling table may be scaled according to a scaling policy. In an exemplary scaling policy, a scaling table is assigned an initial capacity (e.g., 1 terabyte). If the scaling table is filled with data so that the contained data approaches a maximum threshold amount of the capacity (e.g., more than 80% filled), the scaling table may be scaled to a larger capacity (e.g., 20% larger). Similarly, if data is removed from the scaling table so that the contained data is below a minimum threshold amount of the capacity (e.g., less than 20% filled), the table may be scaled to a smaller capacity (e.g., 20% smaller).

However, a web service provider (e.g., AMAZON WEB SERVICES™) may not offer any infrastructure resources that implement a scaling table directly. Instead, the web service provider may offer only fixed-capacity table implementations (e.g., a database server with a fixed amount of disk space to accommodate a fixed-capacity database). However, correctly implementing the software product may be substantially more difficult when using fixed-capacity tables instead of scaling tables. For example, if the software product will need to store an unknown or variable amount of data into the table, then it may be difficult to choose an appropriate capacity for the fixed-capacity table. If the capacity is too small, the software product may exhaust the available storage and will be unable to store further data. If the capacity is too large, the software product may not be able to utilize the storage allocated for the table, which may reduce efficiency and/or increase price of deploying the software product, while also resulting in underutilization of underlying data storage devices. As such, fixed-capacity table infrastructure offered by the web service provider may not be adequate to implement an Automatically-Scaling Table Node resource directly. Instead, a web service provider may offer additional infrastructure resources which may be usable in conjunction with one or more fixed-capacity table infrastructure resources to implement a scaling table. For example, a scaling table may be implemented by starting with an initial fixed-capacity table. Scaling the table according to a scaling policy as described above may include allocating data to store a new table with a larger fixed capacity and copying data from the initial table to the new table. However, implementing a scaling table in this fashion may be complicated by the need to coordinate data and permissions of the initial table and the new table according to the scaling policy.

Accordingly, when an architectural flow diagram including an Automatically-Scaling Table Node is mapped to a set of infrastructure resources according to the present disclosure, the Automatically-Scaling Table Node may be mapped to a plurality of infrastructure resources in order to implement a scaling table architectural resource indirectly via the infrastructure resources offered by the web service provider. For example, a single Automatically-Scaling Table Node may be mapped to four different infrastructure resources: 1) a fixed-capacity table resource (e.g., a virtualized server running database software such as APACHE CASSANDRA™ or MONGODB™); 2) a scaling policy resource (e.g., a cloud infrastructure resource providing access to database entries on a separate database server, the database entries defining parameters of a scaling policy as described above); 3) a permissions resource demarcating permissions to scale the fixed-capacity table resource according to the scaling policy (e.g., a cloud infrastructure resource providing access to database entries defining a permissions setting of data on the web server implementing the fixed-capacity table resource); and 4) a table scaling resource (e.g., an additional virtualized server running software configured to monitor the fixed-capacity table, and when the table needs to be scaled according to the scaling policy, to copy data from the table to a temporary location, allocate a new fixed-capacity table with a suitable capacity according to the scaling policy, and copy the data back to the table from the temporary location).

By mapping the Automatically-Scaling Table Node to four different infrastructure resources as described above, a scaling table architectural resource is made available, even though the web service provider did not offer a scaling table infrastructure resource. Accordingly, a software developer may avoid pitfalls of using a fixed-capacity table or implementing a scaling table in a bespoke fashion (e.g., errors or underutilization of data storage devices as described above). When a scaling table architectural resource is provided in this fashion, the storage devices implementing the scaling table allocate only as much data as is required by the scaling policy. Therefore, compared to an implementation including a fixed-capacity table, the software product may be able to store and utilize an unknown or variable amount of data, while freeing up capacity of the storage device to be used for other tasks.

It will be appreciated that numerous other examples of useful architectural resources may not be offered directly by a web service provider in the form of an infrastructure resource and may instead require two or more infrastructure resources to implement. Accordingly, architectural nodes representing the architectural resources may be mapped to a plurality of infrastructure resources which, in conjunction, implement the architectural resource.

After determining a set of infrastructure resources to implement, method 200 further includes, at 240, automatically provisioning the set of infrastructure resources on the one or more infrastructure computers. Automatically provisioning the set of infrastructure resources on the one or more infrastructure computers includes, at 241, translating the set of infrastructure resources into a computer-readable configuration template having a format useable by a provisioning computer to provision the set of infrastructure resources sufficient to implement the set of architectural resources on the one or more infrastructure computers, and at 242, electronically transmitting the computer-readable configuration template to the provisioning computer. For example, for AMAZON™ services, an AWS CLOUDFORMATION™ and/or AWS SAM™ template may be used.

Although a set of infrastructure resources may be defined in a single computer-readable configuration template as described above, the visual devops application is alternately or additionally configured to provision the set of infrastructure resources according to various other implementation strategies.

For example, the visual devops application is configured to recognize a set of infrastructure resources that are defined across more than one computer-readable configuration template. In some examples, the visual devops application is configured to recognize a set of infrastructure resources including infrastructure resources from a plurality of different cloud providers. Accordingly, provisioning the set of infrastructure resources may include determining a computer-readable configuration template corresponding to each cloud provider and defining infrastructure resources to be provided by that cloud provider, and electronically transmitting each computer-readable configuration template to an appropriate provisioning computer associated with the corresponding cloud provider.

In some examples, provisioning the infrastructure resources to implement an architectural design may include transmission of one or more security credentials required for operating the infrastructure resources. The computer-readable configuration template may include a key associated with a user account of the software developer and administrated by the web service provider, which may be used to determine permission to provision infrastructure resources according to the computer-readable configuration template. In some examples, provisioning the infrastructure resources to implement an architectural design includes defining, in the computer-readable configuration template, one or more security credentials.

The visual devops application may not define a security credential in the computer-readable configuration template. For example, security practices of the developer and/or provider of an infrastructure resource may dictate that certain security credentials should not be transmitted as part of a computer-readable configuration template. For example, configuration templates may be transmitted over potentially insecure channels over which the transmission of security credentials would be inappropriate and potentially deleterious.

Cloud service providers may allow developers to pre-configure one or more infrastructure services with a credential to be able to access a secure key-value store. Accordingly, the visual devops application is configured to use a secure key-value store to store one or more further security credentials, addressed by keys and stored as values (e.g., encrypted, encoded (e.g., base64), and/or plaintext security credentials, such as account keys, passwords, etc.). Keys used to address the security credentials need not be treated as secure information, as the key-value store is only accessible according to the pre-configured credential of the infrastructure resources(s). Accordingly, using the visual devops application, the developer computer, provisioning computer and/or infrastructure computers may be configured to access the further credentials (e.g., to provision further infrastructure services requiring specialized credentials, interact with APIs using API keys, etc.), using pre-configured credentials that are guaranteed to be transmitted in a secure fashion. Then, the visual devops application may configure the developer, provisioning and infrastructure computers to exchange further credentials only by referencing keys in the key-value store. Accordingly, each computer may securely access the key-value store when retrieving the corresponding credential values. In this fashion, the visual devops application is configured to arrange for the further credentials to be available during the provisioning and/or runtime of a computer service, while being restricted to transmission according to the security practices enforced by the secure key-value store. As a non-limiting example, the visual devops application may configure an AMAZON RDS™ store to implement a secure key-value store for storing credentials associated with an architectural design, and configure other infrastructure resources in the implementation of the architectural design to access the AMAZON RDS™ store via a secure communication protocol.

However, it may be computationally inefficient to configure some types of architectural resources to access credentials via a secure key-value store in this fashion, e.g., based on capabilities of current state-of-the art infrastructure resources suitable for implementing such architecture resources. As a non-limiting example, a function resource (e.g., an AWS LAMBDA™ script) may be configured to be invoked with a relatively high frequency, e.g., many times per second. As such, it may be inefficient to configure the function resource to access the key-value store each time a credential is needed.

In some examples, the visual devops application is configured to implement a function resource via infrastructure resources configured to access the key-value store only once, at the time the function resource is provisioned (e.g., caching the credential as an environment variable of the function). However, some cloud service providers may not allow accessing a key-value store in this fashion at the time an infrastructure resource suitable for implementing functions is provisioned. Accordingly, the visual devops application is configured to work around this potential deficiency of a cloud service provider by defining a custom infrastructure resource that can access the key-value store and retrieve relevant environment variables for a function resource. The visual devops application is configured to configure the function resource to depend on the successful instantiation of the custom infrastructure resource, so that the key-value store is accessed one time to retrieve relevant environment variables (e.g., security credentials) from the secure key-value store, while making the environment variables available to the function in subsequent executions of the function. Accordingly, the visual devops application may enable an increased efficiency (e.g., in terms of network latency and bandwidth, and function invocation latency) to execute functions that require secure credentials, as the secure credentials may be made available as cached (e.g., in-memory) values that are accessible without latencies associated with network and/or disk access of the secure key-value store.

For example, with reference to FIG. 1, provisioning computer 12 may be a computer of a web service provider. In this example, the computer-readable configuration template has a format prespecified by the web service provider and is natively useable by the provisioning computer 12 to provision the set of infrastructure resources on the one or more infrastructure computers. For example, the provisioning computer 12 may be a computer owned by Amazon and providing a service to software developers to provision other cloud services offered by Amazon. In other examples, the provisioning computer 12 may be a computer owned by any other web service provider, and may provide a service to software developers to provision corresponding cloud services of the other web service provider. A software developer using the visual devops application 22 may be initially prompted, upon first usage of the visual devops application 22, to associate a user account for the visual devops application 22 with a user account for a web service provider. Accordingly, the visual devops application 22 may monitor account activity of the user account of the web service provider in order to perform suitable functions, including detecting when a new infrastructure resource has recently been provisioned, transferring code and/or settings to cloud storage provided by the web service provider and associated with the user account, and any other suitable function related to provisioning infrastructure resources offered by the web service provider.

The computer-readable configuration template may conform to a pre-specified format, as defined by the web service provider. Based on the pre-specified format, the computer-readable configuration template includes data required by the web-service provider to provision the set of infrastructure resources on the one or more infrastructure computers. In general, the computer-readable configuration template may contain an explicit description of each infrastructure resource. For example, portions of the computer-readable configuration template pertaining to a particular infrastructure resource may include a specific name and geographic region identifier of a web service provider providing the infrastructure resource, an IP address of a server providing the resource, subnet configurations related to infrastructure resources contained within a virtual network node, ingoing and outgoing port assignments, and other configuration parameters of the resource (e.g., a health check interval). The visual devops application may determine "fine-grained" permissions for each infrastructure resource with regard to each other infrastructure resource, so that each infrastructure resource is only given permission to access other infrastructure resources as necessitated by the flow of data in the software product (e.g., according to which architectural resources in the architectural flow diagram are connected with connecting wires). By determining fine-grained permissions, the visual devops application may prevent infrastructure resources from being inappropriately used, improving security of the infrastructure resources and helping to ensure that the infrastructure resources remain available for their designated purpose. It will be appreciated that manually determining "fine-grained" permissions for each infrastructure resource in a complicated software product may be tedious and error-prone, so the visual devops application may substantially reduce a burden on the software developer while also improving security of the software product.

Upon receipt of the computer-readable configuration template, the provisioning computer 12 may provision the requested infrastructure resources in any suitable fashion in order to implement the software product defined by the architectural flow diagram. For example, with regard to FIG. 1, developer computer 20 may electronically transmit the configuration template generated by visual devops application 22 to provisioning computer 12. Upon receipt of the computer-readable configuration template, provisioning computer 12 may configure local infrastructure computers 10A and 10B to provide infrastructure resources 11A and 11B (respectively), and send further messages via network 14 (e.g., the Internet) to remote infrastructure computers 10C and 10D to provision infrastructure resources 11C, 11D, and 11D'.

In some examples, a software developer may implement a software product via infrastructure resources offered by a plurality of different web service providers. In these examples, method 200 may further include recognizing selection of a plurality of web service providers, and for each selected web service provider of the plurality of web service providers, recognizing selection of a subset of architectural nodes of the architectural flow diagram to be provided by the selected web service provider. For example, recognizing selection of the plurality of web service providers may include recognizing GUI inputs to select a plurality of different web service providers from a list of options. Alternately, recognizing selection of the plurality of web service providers may be automatic, based on web service provider accounts to which the user has associated their account for the visual devops application 22. When a plurality of web service providers are selected, method 200 further includes mapping the subset of architectural nodes associated with each selected web service provider to a set of infrastructure resources provided by the selected web service provider and sufficient to implement a corresponding subset of architectural resources, translating the set of infrastructure resources into a computer-readable configuration template having a format prespecified by the selected web service provider and natively useable by the selected web service provider to provision the set of infrastructure resources on the one or more infrastructure computers, and electronically transmitting the computer-readable configuration template to the selected web service provider.

In some examples, the computer-readable configuration template may have a format useable by the provisioning computer to use an application-programming interface (API) of a web service provider to provision the set of infrastructure resources on the one or more infrastructure computers, by issuing an API invocation for each infrastructure resource. In this example, the provisioning computer may be an infrastructure computer of the one or more infrastructure computers, in which case the provisioning computer may be maintained by a web service provider. Alternately, the provisioning computer may be the developer computer, a remote server, or any other suitable computer capable of receiving and interpreting the computer-readable configuration template, and communicatively coupling to a computer of the web service provider in order to issue the sequence of API invocations.

In some examples, the set of architectural resources includes one or more function nodes. When the set of architectural resources includes a function node, method 200 may further include compiling source code associated with the function node into compiled code, and sending the compiled code to one or more of the infrastructure computers. For example, Java or C#/.Net code may be compiled into bytecode suitable for execution via a virtual machine. In another example, C code may be compiled into machine code for native execution. In yet another example, JavaScript code (e.g., a NODE.JS™ application) may be packaged or "minified" to reduce a file size of the code for distribution. By sending pre-compiled code to the one or more infrastructure computers which may later execute the code, the implementation and delivery of the software product may be made simpler and/or more efficient (e.g., since the code does not need to be compiled at each infrastructure computer that will later execute the code). In some examples, the computer-readable configuration template includes a versioning token that is subsequently trackable to determine whether provisioning the set of infrastructure resources succeeded or failed. For example, when the provisioning computer is a computer of a web service provider and the computer-readable configuration template is natively usable by the provisioning computer to provision the set of infrastructure resources, the web service provider may offer a means of tracking a dependency of a logical resource upon a set of infrastructure resources. The versioning token may be implemented as a special logical resource that does not require any corresponding physical or virtual resource, and can be implemented in a trivial way as long as its dependencies are satisfied. The versioning token may be configured to depend on each infrastructure resource in the set of infrastructure resources. Accordingly, the web service provider may later provide a status of the versioning token, based on whether it was successfully implemented. The status of the versioning token may indicate, at a glance, a status of the whole set of infrastructure resources, since the versioning token will only report a "success" status if all of its dependencies (e.g., the whole set of infrastructure resources) are met.

In some examples, after electronically transmitting the computer-readable configuration template to the provisioning computer, the developer computer may receive, from the provisioning computer, a description of a difference between the computer-readable configuration template and a previously transmitted computer-readable configuration template. For example, when the provisioning computer is a computer of a web service provider, it may be configured to provide such a description of a difference between the previous successful configuration and a new configuration (e.g., as a line-by-line set of differences in the computer-readable configuration templates used to define each configuration). After the developer computer receives the description of differences, the visual devops application may visually present an explanation of the difference. For example, the difference may include irrelevant information such as details about the particular infrastructure resources chosen which are not relevant to the behavior of the application designed in the architectural flow diagram (e.g., timestamps, unique identifiers/serial numbers) as well as relevant information (e.g., a number of containers allowed to operate simultaneously by a container cluster), and the explanation of the difference may include filtering out irrelevant information and highlighting relevant information. The explanation of the difference may also include providing documentation and reference materials regarding any features which differ. In this way, the relationship between changes to the architectural flow diagram and changes to a resulting configuration of infrastructure resources may be clarified, enabling the developer to more confidently develop the software application using the visual devops tool.

In some examples, architectural resources of a first software product may be utilized in a second, different software product. For example, a software developer may release two related software products that interact via a common virtual network. In this example, the virtual network should only be defined and deployed once (e.g., the virtual network should be implemented via a single set of infrastructure resources), so that both software products will interact with the same virtual network. Accordingly, when editing the first software product, the visual devops application may export an identifier of an architectural resource to be included in another software product designed with the visual devops application. Then, when editing the second software product, the software developer may include the exported identifier to refer to the architectural resource of the first software product, thereby including the same architectural resource in two different software products. In the example, after exporting an identifier of a virtual network architectural resource from the first software product, the software developer may configure architectural resources of the second software product to reside within the same virtual network.

When two software products share common architectural resources in this fashion, the visual devops application may enforce a relationship between the two software products to ensure that both function properly. In the example, the visual devops application may require that the first software product is fully deployed before the second software product may be deployed, to ensure that the virtual network architectural resource provided by the first software product will be available to the second software product. The visual devops application may also prevent deprovisioning the first software product while the second software product remains deployed, to ensure that the virtual network architectural resource remains available throughout the lifetime of the second software product. Similarly, the visual devops application may prevent changing the shared architectural resource in any way that would render it incompatible with either of the two software products. As such, compared to manually managing a relationship between shared infrastructure resources of the two software products, the visual devops application may prevent errors resulting from misconfiguring shared aspects of software products (e.g., accidentally provisioning two copies of a resource that should be shared, failing to provision a resource before it is needed, and/or accidentally deprovisioning a resource that is still being used).

In some examples, after electronically transmitting the computer-readable configuration template to the provisioning computer, the GUI or any other user interface (e.g., command-line interface) of the visual devops application may visually present an architectural summary of the architectural flow diagram, e.g., in the form of a monitoring graphical user interface visually presented in addition to or instead of the architectural flow diagram. The architectural summary may include, for each architectural node summarized in the summary of the architectural flow diagram, a user-interface affordance that provides access to status data (e.g., current, recent, and/or historical status) of the architectural resource represented by the architectural node. When an architectural resource is implemented by more than one infrastructure resource, the user-interface affordance may provide an aggregated status including status data for each infrastructure resource involved in the implementation of the architectural resource. For example, when an architectural resource requires two or more infrastructure resources to implement, the visual devops application is configured to display a user-interface affordance for the architectural resource that provides an aggregated status including status data from each of the two or more infrastructure resources.

For example, the user-interface affordance may be a uniform resource locator (URL) providing access to a web page administered by a web service provider and indicating status of one or more of the infrastructure resources used to implement the architectural node. The URL may be determined based on the relevant configuration of the infrastructure resources previously determined by the visual devops application and included in the computer-readable configuration template. It will be appreciated that the URL of a status page for a particular infrastructure resource may be a transient URL which is only valid for that particular infrastructure resource, and which may change if the infrastructure resource is reconfigured. Furthermore, since there may be one URL for each infrastructure resource, many URLs may need to be found in order to monitor the collective behavior of the infrastructure resources. As such, automatically determining and presenting a URL for each of the infrastructure resources may save a software developer substantial time and effort, compared to manually finding each relevant URL (e.g., using a web browser to browse web pages of the web service provider).

Alternately or additionally, the user-interface affordance may include a visual indication of status of the architectural resource, for example, an animated chart depicting the throughput of inbound and outbound data associated with the architectural resource. The visual indication may be determined in any suitable way (e.g., by determining a URL of a web page indicating status of each infrastructure resource used to implement the architectural resource, and aggregating information from each of the web pages to generate a chart). When such a visual indication is included, the software developer may be able to monitor relevant aspects of the collective behavior of the infrastructure resources without navigating to a different web page for each infrastructure resource. For example, the web service provider may administer a page for each infrastructure resource indicating a cumulative monetary cost of utilizing the resource. In a software product including two different infrastructure resources, the software developer may wish to compare cumulative monetary cost of the two infrastructure resources. Accordingly, the visual devops application may provide side-by-side visual indications of each cumulative monetary cost, which the software developer may easily compare at a glance without needing to navigate to a separate web page to view the cumulative monetary cost for each resource.

More generally, the visual devops application may provide user-interface affordances for monitoring for a plurality of infrastructure resources offered by one or more infrastructure computers, based on recognizing selection of a set of architectural resources implemented by the infrastructure resources. Responsive to user interface inputs received from a development computer, the visual devops application may visually present a set of architectural nodes in an architectural flow diagram displayed by the development computer, the set of architectural nodes representing the set of architectural resources. The visual devops application may further visually present a monitoring tool configured to display, for each architectural resource in the architectural flow diagram, a user-interface affordance that provides access to status data of the architectural resource represented by the architectural node. In some examples, the user-interface affordance includes one or more of 1) a link to a log for the architectural resource and/or 2) a collection of one or more statistics of the architectural resource. In some examples, the visual devops application may implement an architectural resource via infrastructure resources that support one or more predefined mechanisms for accessing the log and/or the collection of statistics. For example, the log and/or the collection of statistics for the architectural resource may be automatically provided by a cloud service provider associated with one or more infrastructure resources included in an implementation of the architectural resource (e.g., the cloud service provider may make such logs and/or statistics available via a computer network, such as the Internet). Alternately or additionally, the visual devops application may be configured to monitor the infrastructure resources to aggregate logging and/or statistical information. In some examples, the visual devops application may configure one or more infrastructure computers to perform such aggregation, e.g., by monitoring other infrastructure resources that are included in an implementation of a particular architectural resource, in order to determine logs/statistics for that architectural resource. The information provided by the visual devops application may call specific attention to errors, e.g., by prominently displaying errors and "action items" that should be fixed. The visual devops application is configured to present information so as to emphasize relevant aspects of the behavior of architectural resources with regard to architectural relationships, e.g., to show how dataflow from one architectural resource may impact dataflow of a downstream architectural resource. For example, when the visual devops application shows a developer relevant statistics, logs, and errors corresponding to each architectural node as arranged in the architectural flow diagram, the cause of errors and/or reduced performance may be more readily apparent to the developer. Because the visual devops application presents information so as to emphasize relevant details of relationships(e.g., dataflow relationships) between architectural resources while abstracting away from irrelevant details (e.g., exact configuration of infrastructure resources), a developer using the visual devops application may be more readily able to diagnose and fix errors, and/or improve performance of a computer service by inspecting the live behavior of the computer service in terms of relationships between architectural resources.

Non-limiting examples of events and statistics which the visual devops application is configured to track include: 1) for function nodes: invocation counts, error counts, duration of invocation, average duration of invocation across a number of invocations, error rate across a number of invocations; 2) for REST APIs: error counts (e.g., sorted by type of error, such as 4xx error, 5xx error, and/or other errors), request/response latency, request count, average latency across a number of requests; 3) for databases: free storage space available, freeable memory available, CPU utilization percentage, average freeable memory and/or CPU utilization, number of database connections, errors, uptime; 4) for object stores: request counts, errors (e.g., 4xx and/or 5xx errors); 5) for streams (e.g., AMAZON KINESIS™ streams): number of incoming/enqueued records, number of outgoing/fetched records, errors. More generally, statistics may be determined in any suitable manner based on any relevant behavior of infrastructure resources with regard to one or more architectural resources, e.g., by counting events of interest, averaging or otherwise statistically aggregating such counts, etc. As a non-limiting example, aggregating statistics may include counting events as described above, across various time ranges (e.g., 5 minutes, 1 hour, 1 day, and 1 week), and determining statistics of the events occurring within each different time range.

In addition to allowing a user to edit and/or deploy a software stack defined via an architectural flow diagram, the visual devops application is configured to further enable importing a software stack from a definition in one or more computer-readable template files (e.g., for editing and/or for deployment). Accordingly, FIG. 5 shows a method 500 for importing a computer-readable configuration template for provisioning a set of infrastructure resources, into an architectural diagram representing a set of architectural resources derived from the infrastructure resources.

At 510, method 500 includes recognizing, in a computer-readable configuration template having a format useable by a provisioning computer to provision a set of infrastructure resources on one or more infrastructure computers, a set of architectural resources derived from the set of infrastructure resources defined by the template (e.g., a set of architectural resources for which the infrastructure resources defined by the template are sufficient to implement the set of architectural resources, and/or a set of architectural resources that the visual devops application is configured to map to the same and/or similar infrastructure resources defined by the template). In some examples, method 500 may include reading more than one computer-readable configuration template (e.g., a plurality of templates in a source code repository such as a GIT™ repository for configuring infrastructure resources). Accordingly, method 500 includes recognizing a set of architectural resources derived from a set of infrastructure resources defined by the plurality of templates. The visual devops application is configured to recognize architecture resources based on infrastructure resources defined in any suitable computer-readable format(s), e.g., AWS CLOUDFORMATION™ templates, AWS SERVERLESS APPLICATION MODEL (AWS SAM™) templates, AZURE RESOURCE MANAGER™ templates, or any other suitable template format(s) associated with available infrastructure resources.

At 520, method 500 further includes visually presenting a set of architectural nodes in an architectural flow diagram displayed by the development computer, the set of architectural nodes representing the set of architectural resources. In some examples, the visual devops application is configured to automatically lay out the set of architectural nodes in an automatic layout representing relationships among the architectural resources. The visual devops application is configured to determine the automatic layout based on the dataflow and/or network structure of the computer service in terms of the relationship between architectural resources, thereby emphasizing relevant details.

In an example the visual devops application is configured to determine an automatic layout for an architectural design containing a plurality of different architectural resources. The visual devops application may determine that each architectural resource can be implemented by one or more different (possibly overlapping/commonly used) infrastructure resources. Although the visual devops application may determine that an implementation of the architectural design includes a complicated dataflow/network relationship among the infrastructure resources, the visual devops application may determine an automatic layout which may nevertheless emphasize relevant aspects of the dataflow and/or behavior of architectural resources while abstracting away from potentially irrelevant details. As one non-limiting example, the visual devops application may recognize that a plurality of infrastructure resources is configured with a complicated error-handling scheme including substantial cyclic dataflow. Regardless, the visual devops application is configured to determine an automatic layout showing architectural nodes that substantially abstract away from such dataflow, e.g., by showing all error-related dataflow with regard to a single, shared "error" node representing the error-handling component(s) of the computer service at an architecturally relevant scope and level of abstraction.

The visual devops application is configured to recognize architectural resources based on recognizing common patterns of configuration of infrastructure resources, and/or recognizing architecture resources which may possibly be implemented by one or more infrastructure resources. The visual devops application may recognize particular architectural resources by reversing the translating and mapping processes described above with regard to method 200. Further specific examples of architectural nodes will be described in more detail below including discussion of exemplary sets of infrastructure resources which are suitable for implementing each architectural node type; accordingly, the visual devops application may recognize each type of architectural node based on recognizing one or more infrastructure resources which are suitable for implementing the architectural node as described below.

The visual devops application is configured to determine the automatic so as to represent relevant details of relationships among the architectural resources, while abstracting away from irrelevant details of the specific configuration of infrastructure resources. Template files for infrastructure resources typically do not include any information which would be suitable for determining a specific layout of architecture nodes. Accordingly, the visual devops application is configured to automatically lay out the architectural nodes through a layout algorithm, even in absence of specific layout information in the template files. In other words, the automatic layout may be determined (e.g., based on relationships between architectural resources) even when the layout is not specified in the computer-readable template(s). The visual devops application is configured to determine the automatic layout by arranging architectural nodes in the architectural flow diagram and connecting the architectural nodes with connecting wires based on a relationship between the architectural resources they represent.

The template(s) may not define any notion of architectural resources, but may instead define configuration settings for each of a plurality of different infrastructure resources. In some examples, when a template defines a first infrastructure resource with an addressable identifier (e.g., any suitable associated name, address, and/or any other identifier) and a second infrastructure resource that refers to that addressable identifier, the visual devops application is configured to infer the presence in the architectural flow diagram of 1) a first architectural resource corresponding, at least in part, to the first infrastructure resource, 2) a second architectural resource corresponding, at least in part, to the second infrastructure resource, and 3) a connecting wire between the two architectural resources based on a relationship between the two infrastructure resources. In some examples, when a template defines two infrastructure resources with related names/addresses in this fashion, the visual devops application is configured to infer the presence of a single architectural resource implemented by both of the two infrastructure resources based on a relationship between the two infrastructure resources. Similarly, the visual devops application is configured to recognize containment based on related names/addresses, e.g., to infer presence of two architectural resources with a containment relationship based on a relationship between the two infrastructure resources. In some examples, the visual devops application is configured to recognize a potential relationship as being more likely to be a connecting wire and/or a containment relationship based on a conventional semantics of one or more infrastructure resources involved in the relationship, e.g., by recognizing that subnet configuration settings relate to a containment relationship for a subnet architectural node. In some examples, the visual devops application is configured to determine an automatic layout including link in/link out nodes to avoid crossing wires, e.g., so as to minimize a number of crossing wires or keep a number of crossing wires below a predefined threshold.

Accordingly, the visual devops application is configured to automatically generate a well-organized layout that emphasizes architectural relationships in the design. The visual devops application may achieve results of similar quality to a layout a developer would produce using the visual devops application, while alleviating the need for the developer to manually produce the architectural flow diagram (e.g., by manually laying out nodes in a development canvas and/or scripting the creation of the architectural flow diagram in a command line tool).

In some examples, the visual devops application is configured to arrange the architectural nodes in a substantially columnar layout wherein architectural nodes are arranged in a dependency order (e.g., left-to-right, wherein a first architectural node is arranged in a column to the left of a second architectural node if the first architectural node corresponds to a resource that generally outputs data that is used as an input by the architectural resource corresponding to the second node). The visual devops application is configured to recognize when architectural resources have a cyclic ordering of dataflow (e.g., wherein outputs of an architectural resource may influence subsequent inputs to that same architectural resource). In such cases, it may not be possible to show the dataflow in a strictly ordered fashion. Nevertheless, the visual devops application is configured to show an architectural design with cyclic ordering of dataflow by looping wires according to the dataflow cycle, while generally arranging architectural resources in a columnar arrangement. Whether or not the architectural flow diagram includes cycles, determining the automatic layout may further include placing connecting wires so as to reduce (e.g., minimize) a number of wire crossings.

Optionally, at 530, method 500 further includes recognizing a change to the architectural flow diagram. For example, the change may be based on a user interface input, e.g., at a development canvas or command line tool as described above. Alternately or additionally, the change may be based on a change to one or more configuration templates (e.g., an update to a source code repository defining the template(s)). Based on the changes to the architectural flow diagram, the visual devops application is configured to recognize a changed set of infrastructure resources suitable for implementing the changed architectural flow diagram. For example, the visual devops application may map the architectural resources of the architectural flow diagram to the changed set of infrastructure resources according to method 200 as described above. Alternately or additionally, the visual devops application is configured to map a particular change to the architectural flow diagram to a corresponding change to one or more infrastructure resources in the set of infrastructure resources.

Accordingly, at 540, method 500 further optionally includes, based on the change to the architectural flow diagram, defining a changed computer-readable configuration template, having a format useable by a provisioning computer to provision the changed set of infrastructure resources on the one or more infrastructure computers. The computer-readable configuration template may have the same or different format from the configuration template(s) that were imported to create the architectural flow diagram. In some examples, defining the changed computer-readable configuration template includes defining more than one configuration template (e.g., defining multiple configuration templates within a source code repository).

At 550, method 500 optionally includes provisioning the changed set of infrastructure resources on the one or more infrastructure computers. The visual devops application may provision the changed set of infrastructure resources in any suitable fashion, e.g., by translating the changed set of infrastructure resources to the computer-readable configuration template(s) as described above with regard to method 200, and electronically transmitting the computer-readable configuration template(s) to the infrastructure computers.

The above described methods may be performed differently with particular regard to various node types. Each node type may contribute different functionality to a software product. Accordingly, each node type may be mapped to different infrastructure resources, and such infrastructure resources may be translated into one or more computer-readable configuration templates differently, based on the different node types. An exemplary selection of available node types is described below. The following node types are described with reference to the visual devops application 22 shown in FIG. 3.

Rest Api Node: A Rest Api node implements a Rest Api to access services and/or functions within the architecture design assembled on the development canvas 32. The Rest Api node creates an endpoint for receiving and/or sending messages from external components (e.g., another application, outside services, a client process, a browser, a user, etc.). For example, the Rest Api node may receive HTTP (hypertext transfer protocol) requests. When HTTP requests are received, an internal message is generated and output to a downstream node, generally a Function node. The Rest Api node may be limited to connection to Function nodes and may be limited to connection to a single Function node. After processing the internal message from the Rest Api node, the downstream node may return a response to be processed and/or sent by the Rest Api node to the original external component that sourced the external message (or to another designated external component). The Rest Api node generally is implemented as a service, microservice, or script that runs on a virtual machine within the cloud infrastructure environment.

As an example of the processing by the Rest Api node, an HTTP request transaction is detailed. When an HTTP request is received, the Rest Api node outputs a message to the downstream node that contains all the details of the request. Examples of fields and their contents are shown in Table 1.

TABLE 1

| Field | Type | Description |
| --- | --- | --- |
| method | string | Method of the request. Example: "method": "GET" |
| pathname | string | Path of the request, excluding query string. Example: "pathname": "/users/5" |
| endpoint | string | Resource endpoint matching the path of the request. Example: "endpoint": "/users/{id}" |
| resourceParams | Object | Map of resource parameter values. Example: { "id": "5" } |
| Query | Object | Map of decoded query string parameter values. Example: { "admin": "true" } |
| headers | Object | Map of request header values. Example: { "Host ": "stacks.stackery.io", "Accept": "application/json" } |

TABLE 1-continued

| Field | Type | Description |
|---|---|---|
| Body | Buffer | Request body. |
| Ip | string | IP (internet protocol) Address of requesting client. Example: "ip": "38.182.58.3" |
| requestId | string | Request ID (identification) as a GUID (globally unique identifier). Example: "requestId": "a0a5150b-a050-11e6-895a-159872556d76" |

A Function node receiving a request message from the Rest Api node is expected to respond with a message containing the HTTP response. Examples of fields and their contents are shown in Table 2.

TABLE 2

| Field | Type | Default | Description |
|---|---|---|---|
| statusCode | Number | 200 if body provided, else 204 | Status code of the response. Example: "statusCode": 202 |
| Headers | Object | { } | Map of response header values. Example: { "Content-Type": "text/html", "Access-Control-Allow-Origin": "example.com" } |
| Body | Buffer or string | Null | Body of response. |

Settings for the Rest Api node may include name, endpoint, allow browsers, allowed domains, allow requests from any domain, allowed request headers, exposed response headers, allow receiving cookies, and/or permissions cache TTL (time to live). The name setting is a label for the node in the canvas. The endpoint setting specifies the path or paths that will be handled by the Rest Api node. The endpoint value may define a single path, a path with resource parameters, and/or a wildcard (e.g., *). Examples of endpoint values include one or more of the following: /users, /users/{id}, /users/{id}/{property}, /users/{id}/emails/{email}, and /users/{id}/locations/*.

Items in curly braces ("{" and "}") may be substituted with an identification, property, or email as appropriate.

When a request matches an endpoint with resource parameters, the value of the parameters may be provided in the resourceParams field of the request message. For example, a request made to /users/5/locations/US/OR/97205/1000-SW-Broadway would have the following request message fields:

```
{
    ...
    "pathname": "/users/5/locations/US/OR/97205/1000-SW-Broadway",
    "endpoint": "/users/{id}/locations/*",
    "resourceParams": {
    "id": "5",
    "*": "US/OR/97205/1000-SW-Broadway"
    }
}
```

The 'allow browsers' setting affects access control of HTTP requests across different resource origins. More specifically, when the 'allow browsers' setting is enabled, an OPTIONS method will be added to the Rest Api to handle preflighted CORS (cross-origin resource sharing) requests. Additionally, an Access-Control-Allow-Origin header will be added to all other responses. CORS is a security measure that often must be configured for websites to be able to call HTTP Rest Apis from the browser.

When the 'allow requests from any domain' setting is enabled, the Access-Control-Allow-Origin header in the response will be set to the request's "referrer" domain. This allows any website to make requests to this endpoint. When the 'allow requests from any domain' setting is disabled, the Access-Control-Allow-Origin header in the response will only be set to the request's "referrer" domain if the domain is listed in the 'allowed domains' setting. Domains listed in the 'allowed domains' may contain a wildcard character (e.g., *). Examples of domains in the 'allowed domains' setting include one or more of: example.com, *.example.com, stg.*.example.com. If the request's "referrer" domain does not match an allowed domain, the Access-Control-Allow-Origin header will be blank, which prevents browsers from handling the resource and its data.

The 'allowed request headers' setting (a list of allowed request headers) affects which header names are permitted when responding to a preflighted CORS request. When a browser makes a preflighted CORS request, it asks permission to send some header values by listing those values in the Access-Control-Request-Headers request header. The server then responds with a list of header values it will allow the browser to send via the Access-Control-Allow-Headers response header. The Rest Api node will set the value of the Access-Control-Allow-Headers response header to the intersection of the header names provided in the 'allowed request headers' list and the header names in the Access-Control-Request-Headers request header.

The 'exposed response headers' setting (a list of exposed response headers) affects which headers are exposed to a browser's JavaScript runtime. For some headers of a response, the value of the header is not provided to the browser's JavaScript runtime by default. The headers provided in the 'exposed response headers' list will be provided in the response header Access-Control-Expose-Headers by the Rest Api node. The browser will then provide these header values to its JavaScript runtime.

The 'allow receiving cookies' setting affects whether cookies are allowed. Browsers will not send the value of cookies when making requests initiated from the browser's JavaScript runtime by default. However, a request can be made using cookies, but the server must also allow cookies to be read and/or set by setting the response header Access-Control-Allow-Credentials to "true". When the 'allow receiving cookies' setting is enabled, all responses from the Rest Api node will have this header set.

The 'permissions cache TTL' setting affects how long permissions from a preflighted CORS request may be cached. Permissions granted from a preflighted CORS request may be cached by the browser. The Access-Control-Max-Age header value specifies how long, in seconds, these permissions may be cached. The 'permission cache TTL' setting specifies the value of the Access-Control-Max-Age header. The value of the Access-Control-Max-Age header is an upper bound on the length of time permissions may be cached. Most browsers have internal limits on how long the permissions may be cached, usually on the order of five to ten minutes.

The Rest Api node complies with timeout limits for HTTP requests but does not necessarily enforce the timeout limits on a connected Function node. HTTP requests have a maximum length for response of 30 seconds. If a connected Function node does not respond within 30 seconds, the client (e.g., browser) will receive an HTTP 502 Bad Gateway response.

The Rest Api node generally may be configured to receive and send message bodies from/to external processes (e.g., client, browser, etc.) that are Unicode compatible. Request or response bodies that are not Unicode compatible may be mangled (and the data compromised). Binary data may be received or sent in Unicode compatible format if encoded with common encoding formats like Base64 or Z85 (binary to text encoding formats). Additionally or alternatively, binary data may be transferred by using pre-signed URLs (uniform resource locators) within HTTP redirect responses. In such case, a client may transparently operate with the storage service (e.g., AMAZON WEB SERVICES S3™, GOOGLE CLOUD STORAGE™, AZURE CLOUD SERVICES™ storage services, etc.) that the URL points to.

Rest Api nodes may be configured to receive and/or send using HTTP compression. HTTP compression may be limited to specific compression protocols. Some Rest Api nodes may not receive, send, or otherwise be compatible with HTTP compression. For example, a Rest Api node that does not work with binary bodies may not be compatible with HTTP compression.

Rest Api nodes may be configured to receive and/or send a single header value per header name or multiple header values per header name. The HTTP standard defines header names to be case-insensitive. Some Rest Api nodes may be configured to transparently receive and/or send headers (using the original text values including any original text case). With a Rest Api that transparently receives and/or sends headers, multiple header values per header name may be transmitted by encoding the same header name with different text case for each desired header value. For example, an HTTP header with the fields "X-My-Header: value1" and "x-my-header: value 2" will transmit both the values "value1" and "value2" for the "x-my-header" header name.

Function Node: A Function node implements a service, an independent function, and/or a microservice. The Function node may be implemented in infrastructure resources as a virtual machine, a cluster of virtual machines, a container (e.g., a DOCKER™ container), and/or a script (e.g., an AMAZON LAMBDA™ service). The Function node is shown in use on the canvas 32 at 44A.

The Function node executes functional code (a function process) when the Function node receives an incoming message (e.g., from a Rest Api node). The Function node may output new messages to further, downstream nodes and/or may respond to calling nodes (e.g., a Rest Api). Generally, messages to or from the Function node may be in any format defined by the Function node. The Function node may be configured to accept inbound and/or outbound network connection. In some embodiments, network connections may be refused and/or restricted. For example, a Function node may block all inbound network connections (inbound connections may be received indirectly via a Rest Api node) and may permit all outbound network connections (or all outbound connections except the networking port 25, a port that may be exploited to send spam email).

As an example of the processing environment, a Function node may correspond to a NODE.JS™ runtime with 500 MB (megabyte) scratch space, memory from 128 MB to 1,536 MB, and compute power and bandwidth corresponding to the memory size.

Errors from execution of the functional code of the Function node may produce errors that may be emitted from an Errors node (as shown in the node toolbar 34 in FIG. 3). Additionally or alternatively, errors may be recorded in a log (e.g., logged to the console in a NODE.JS™ runtime environment). Examples of errors that may be emitted from the Errors node (or otherwise indicated) include uncaught exceptions (e.g., an uncaught exception generated within the processing environment), execution within the Function node times out (e.g., takes longer than a predetermined timeout threshold), the functional code returns an error condition (e.g., in JavaScript, a callback function is called with a truthy error argument, e.g., an argument equivalent to the literal 'true' value, including values such as the numeric '1' value), and the functional code process exits before handling a message (e.g., in JavaScript, exiting before a scheduled callback is called (e.g., the done callback function as described further herein) and/or before a returned Promise object is resolved or rejected). A Promise object is a feature supported by some browsers (e.g., Chrome, Firefox, Opera, and Safari) and is used in asynchronous computations, typically using JavaScript. See, e.g., https://developer.mozilla.org/en-US/docs/Web/JavaScript/Reference/Global_Objects/Promise, the disclosure of which is hereby incorporated by reference for all purposes.

Settings for the Function node may include name, outputs, timeout, memory, and/or source code. The name setting is a label for the node in the canvas. The name setting also may be used to identify the location of the source code in a repository (such as a Git repository). The outputs setting specifies the number of output ports. Each output port can be connected to any number of other nodes. When the Function node outputs a message, as discussed further herein, the message is output to all the nodes connected to one of the output ports. The timeout setting is the maximum amount of time the Function node is allowed to execute the function process in response to an input message. Typically values may range from 1-300 seconds. As discussed herein, an error may be generated and/or indicated if the timeout value is exceeded during an attempted response to an incoming message. The memory setting specifies the amount of memory allocated to the function process. Additionally or alternatively, settings may include compute power (e.g., number of processors) and/or bandwidth (e.g., incoming and/or outgoing message bandwidth limits).

Source code settings may include source code location (e.g., directly stored in the settings, in a storage location, at a URL, or in a repository such as a Git repository), a handler function, an output function, a done function, and code dependencies. The code dependencies setting identifies code dependencies (auxiliary code and/or environment required for the source code to function properly). The identified code dependencies may be specified by location, package, etc. in a manner similar to the source code location.

Source code may be provided in a format compatible with the runtime environment of the Function node (e.g., source code is JavaScript). The source code may be defined and/or organized with a top-level index file (e.g., an index.js file). The top-level index file may export a handler function and/or the source code settings may specify a handler function. For example, the handler function may be of the form: function handler (message, output [, done]) where the message argument is the incoming message received by the Function node. The output argument is a function that may be called to output messages to further nodes. The done argument is optional (as indicated by the square braces ("[" and "]"). The done argument is a function that may be called (or otherwise invoked) when the handler function is prepared to terminate (or when the handler function does terminate). The done function also may be referred to as a callback function.

If the handler function is to use the done callback function, the handler function may signal this design by returning a predefined value (e.g., the 'undefined' value in JavaScript, which represents no value returned). The done function may be used to emit an error (or lack thereof) and/or response information. For example, the done function may be of the form: function done (err, response). If the err argument is truthy, the associated error (e.g., the value of the response argument) may be generated and/or indicated as discussed herein (e.g., by the Errors node). If the err argument is falsey (e.g., equivalent to the literal 'false' value, including values such as the numeric '0' value), the value of the response argument may be sent back to the node that called the Function node.

Generally, the handler function will execute until either the done function is invoked or a Promise object returned by the handler function is resolved or rejected. The handler function may signal an intent to use a Promise object by returning a predefined value (e.g., a Promise object or anything but the 'undefined' value in JavaScript). If the returned value is a Promise object, the runtime of the Function node will wait until the Promise object is resolved or rejected. If resolved, the resolved data may be used as a response message that may be sent back to the node that called the Function node. If rejected, the rejected data may be generated and/or indicated as discussed herein (e.g., by the Errors node). If the returned value of the handler function is not a Promise object, it may be a response that is sent back to the node that called the Function node.

The output function supplied to the handler function (e.g., as the output argument) or otherwise specified in the settings of the Function node, may be configured to send the output message to downstream nodes connected to the Function node. The output function may take the form: function output (message [, options [, callback]]). The output function may output (from the Function node) the message supplied by the message argument. The optional options argument may specify how the message may be transmitted (e.g., the argument may specify the port for the output message and/or whether to use a Promise object). The optional callback argument may be a function that may be called (or otherwise invoked) when the output function is prepared to terminate (or when the output function does terminate). The use of a Promise object with the output function may be in a similar manner as that described with respect to the handler function.

The Function node may supply messages to downstream nodes and/or the Error node as described. Additionally or alternatively, the Function node may record messages in a log (e.g., logged to the console in a NODE.JS™ runtime environment).

Stream Node: A Stream node (a shown in the node toolbar 34 in FIG. 3) implements a stream object which receives messages at its input and inserts the messages into a persistent queue. Each node connected to the output of the Stream node will receive a copy of the messages placed in the stream, in the order received by the stream. The Stream node may be implemented in infrastructure resources as a virtual machine, a cluster of virtual machines, a container (e.g., a DOCKER™ container), a script (e.g., an AMAZON LAMBDA™ service), and/or a dedicated stream infrastructure resource (e.g., an AMAZON KINESIS™ stream). The Stream node may include a runtime environment and/or code to implement a stream object (e.g., JavaScript code to implement a 'stream' object in JavaScript).

The Stream node may ensure (or substantially ensure) the delivery of messages and/or the order of delivery of messages. The Stream node may implement a buffer sufficient to hold undelivered messages for a long time, e.g., for 24 hours. The Stream node may be configured and/or programmed to retry outputting a message to a node if a node fails to process the message. The Stream node may be configured and/or programmed to continue to output a message until the message is processed or a defined timeout period elapses (e.g., 24 hours).

HTTP Request Node: An HTTP Request node (not illustrated in the node toolbar 34 of FIG. 3) implements HTTP requests in response to incoming messages from other nodes. The HTTP Request node is similar to the Rest Api node except that the HTTP Request node generally sends external messages in response to incoming internal messages from other nodes whereas the Rest Api node generally responds to external messages destine for other nodes. The HTTP Request node generally is implemented as a service, microservice, or script that runs on a virtual machine or container within the cloud infrastructure environment. The HTTP Request node may be configured to follow HTTP 3XX redirect responses for multiple times (e.g., up to 10 times).

Incoming messages to the HTTP Request node include data (typically in the form of fields) to be sent in an outgoing HTTP request. Examples of fields and their contents are shown in Table 3.

TABLE 3

| Field | Type | Default | Description |
|---|---|---|---|
| method | string | Value of method setting | Method of the request. Example: "method": "POST" |
| url | string | Value of URL setting | The URL of the request, including protocol, basic authentication, host, port, path, and query string. Example: "url": "https: //user:pass@example.com:1234/path?query= true" |
| headers | Object | { } | Map of request header values. Example: { "Accept": "application/json" } |
| body | Buffer or string | "" | Body of request. Example: "body": "{\"name\": \"Roger\"}" |

TABLE 3-continued

| Field | Type | Default | Description |
|---|---|---|---|
| context | Any | undefined | Data that will be proxied through as part of the output message sent to connected nodes. Example: "context": { "userId": 5 } |

Settings for the HTTP Request node may include name, method (e.g., Post or Put), and URL. The name setting is a label for the node in the canvas. The method setting specifies the default method for HTTP request (typically Post). The URL setting specifies the default URL for HTTP requests. The URL setting may include the protocol, type of authentication, host, port, path, and/or query string.

Table Node: A Table node (not illustrated in the node toolbar 34 of FIG. 3) implements a database. The Table node may implement a schema-less database (e.g., a NoSQL database), a relational database, and/or databases with other logical data models. The Table node may be an Automatically-Scaling Table Node or a fixed-capacity Table Node. The Table node generally is implemented as a service or microservice that runs on a virtual machine, a cluster, a container, or a container cluster within the cloud infrastructure environment. For example, the Table node may be implemented by various infrastructure resources, non-limiting examples of which include an AMAZON DYNAMO DB™ service, a MONGO DB™ database service, an AMAZON RDS™ service, or a HEROKU POSTGRES™ database service.

Incoming messages to the Table node may be queries to the database managed by the Table node. Outgoing messages may include data retrieved from the database managed by the Table node. Incoming messages may be structured according to the desired operation. For example, the incoming message may include a statement field and a query/operation value (e.g., "statement": "insert", where the statement field is represented by "statement" and the query/operation value is represented by "insert"). Examples of query/operation values include "insert", "put", and "select".

For "insert" queries, the incoming message may include a "record" field that describes an object to be inserted into the database. The object may be described by JSON-compatible text. JSON (JavaScript object notation) is an open standard format for describing objects by attribute-value pairs. If the object exists in the database or if the database has a record at the location where the specified object is to be inserted, the Table node may respond with an error (e.g., as discussed herein with respect to the Error node).

For "put" queries, the incoming message may include a "record" field that describes an object to be inserted into the database, overwriting records as need be. The object may be described by JSON-compatible text. The Table node may respond to the calling node (that supplied the incoming message) with the value of the old record (if any old record was overwritten).

For "select" queries, the incoming message may specify database records, e.g., by specifying the hash and/or the key range. The Table node may respond to the calling node and/or any downstream node with the value of the selected record(s). If no records are identified in the database that match the "select" object, the Table node may respond with an error (e.g., as discussed herein with respect to the Error node).

Settings for the Table node may include name, method (e.g., Insert, Put, or Select), and URL. The name setting is a label for the node in the canvas. The method setting specifies the default method for the database query/operation. The URL setting specifies the default URL for database requests. The URL setting may include the protocol, type of authentication, host, port, path, and/or query string.

Other Node Types:

A Virtual Network node implements a virtual network that may contain other nodes 40. The virtual network may facilitate access between nodes 40 within the virtual network and/or may restrict access from nodes 40 that are outside the virtual network. The Virtual Network node is shown in use on the canvas 32 at 46A (in FIG. 3). In the example of FIG. 3, the Virtual Network node 46A contains the Function node 44A, the Container Cluster node 46B, the Container service nodes 44C (contained in the Container Cluster node 46B), and the Load Balancer node 44D.

A Container Cluster node implements a container cluster (a container services cluster) that may host container services (containers, also called container services). The container services node (also referred to as a Container node) implements a container service (a container). Containers are a technology that packages a piece of software in a standardized unit for software development and deployment. See, e.g., https://www.docker.com/what-docker, the complete disclosure of which is hereby incorporated by reference for all purposes. A standardized container generally includes the runtime, system tools, and system libraries. Containers generally are implemented as an operating system virtualization (e.g., isolated Linux partitions). Containers are run (hosted) within a container server (a single machine) or container cluster (a cluster of machines operated as a unit). Examples of container systems include DOCKER™ (including DOCKER SWARM™, both open source projects managed by Docker Inc.) and KUBERNETES™ (an open source project managed by Cloud Native Computing Foundation). Though referred to as Container Cluster node and Container services node, the Container Cluster node and Container services node are not restricted to DOCKER™ technology and may be implemented with other container technology. In FIG. 3, the Container Cluster node 46B is shown in use on the canvas 32 and hosting two Container services nodes 44C.

A Load Balancer node implements a load balancer to distribute dataflow among various downstream nodes 40. Load balancing improves the distribution of workloads across multiple computing resources, such as virtual machines, clusters, and/or containers. Load balancing generally makes resource use more consistent (more equal use of individual resources) and avoids overloading any single resource. The Load Balancer node may be implemented by switches, Domain Name System server processes, Classic Load Balancers by AMAZON WEB SERVICES™, and/or Application Load Balancers by AMAZON WEB SERVICES™. Load Balancers may distribute dataflow in any suitable manner and are not limited to the above examples of load-balancing infrastructure resources, Load balancers may be implemented with any suitable combination of infrastructure resources configured to distribute workloads.

A Timer node implements a timer that provides a time signal to other nodes 40. The time signal may be a real-time clock, a (shared) time counter, and/or an alarm.

A Link Out node and a Link In node provide points to split dataflow in an architectural flow diagram. The messages directed to a Link Out node are emitted out of a corresponding Link In node, without requiring a connecting wire. For example, each Link In/Link Out pair may share a common label, so that the Link In node corresponding to a Link Out node may be identified based on the label. When a message is sent from an upstream node to the Link Out node, the same message is relayed via the Link In node to a downstream node. The combination of the Link Out node and the Link In node in are equivalent to a single connecting wire connecting between the sending socket of the upstream node and the receiving socket of the downstream node.

In addition to or instead of facilitating the implementation of an architectural flow diagram via infrastructure resources according to method 200, a visual devops application according to the present disclosure may also provide infrastructure resource diagramming. Infrastructure resource diagramming includes translating an existing configuration of infrastructure resources into an architectural flow diagram which may be further edited and/or deployed by the visual devops application as described above.

For example, a software developer may have an existing software product that was previously implemented directly using infrastructure resources offered by a web service provider. The software developer may wish to leverage the visual devops tool, for example, to inspect and monitor the infrastructure resources, and to incorporate new architectural resources available in the visual devops tool into the software product. Furthermore, the software developer may wish to edit the configuration of the infrastructure resources in the form of a flow diagram in order to facilitate easily replacing infrastructure resources with architectural resources. For example, the software developer may wish to replace a fixed-capacity table infrastructure resource with an Automatically-Scaling Table architectural resource as described above. After first importing the existing configuration of infrastructure resources into an architectural flow diagram, replacing the fixed-capacity table with an Automatically-Scaling Table may be as simple as replacing a node representing the fixed-capacity table infrastructure resource with an Automatically-Scaling Table Node, and dragging connecting wires that were previously connected to the fixed-capacity table node to instead connect to the Automatically-Scaling Table Node. The visual devops application may translate infrastructure resources in any suitable fashion. For example, the visual devops application may translate infrastructure resources by analyzing a computer-readable configuration template having a template pre-specified by the web service provider, and parsing the computer-readable configuration template to determine what infrastructure resources and relationships between infrastructure resources to include in the architectural flow diagram. Alternatively or in addition, the visual devops application may import infrastructure resources by invoking an API of the web service provider (e.g., to query a list of resources associated with a previous deployment made via the web service provider).

In some embodiments, the methods and processes described herein may be tied to a computing system of one or more computing devices. In particular, such methods and processes may be implemented as a computer-application program or service, an application-programming interface (API), and/or other computer-program product.

Figure 6:
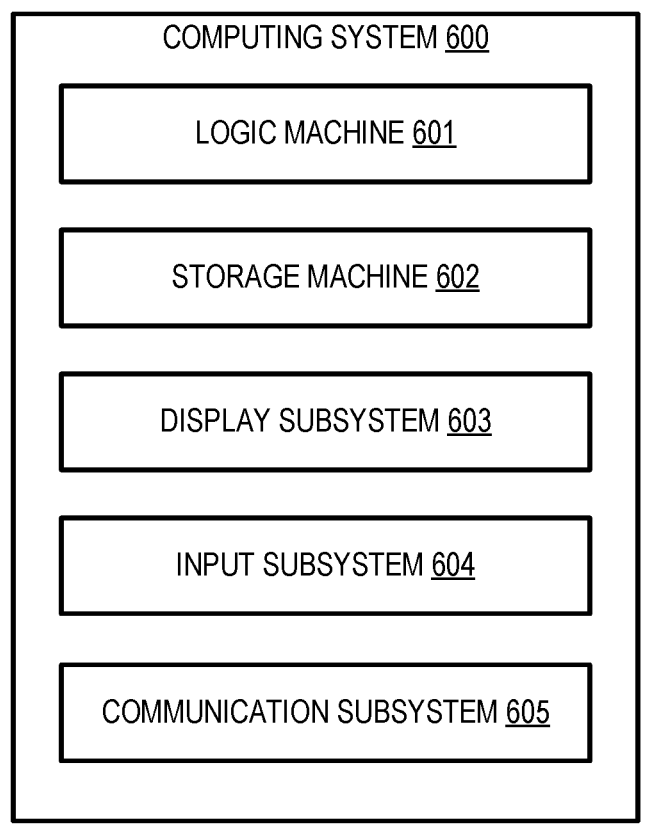
FIG. 6 shows an example computing system.

FIG. 6 schematically shows a non-limiting embodiment of a computing system 600 that can enact one or more of the methods and processes described above (e.g., method 200 of FIG. 2 and/or method 500 of FIG. 5). Computing system 600 is shown in simplified form. Computing system 600 may take the form of one or more personal computers, server computers, tablet computers, network computing devices, mobile computing devices, mobile communication devices (e.g., smart phone), and/or other computing devices. Provisioning computer 12, developer computer 20, and infrastructure computers 10A-10D are nonlimiting examples of computing system 600.

Computing system 600 includes a logic machine 601 and a storage machine 602. Computing system 600 may optionally include a display subsystem 603, input subsystem 604, communication subsystem 605, and/or other components not shown in FIG. 5.

Logic machine 601 includes one or more physical devices configured to execute instructions. For example, the logic machine may be configured to execute instructions that are part of one or more applications, services, programs, routines, libraries, objects, components, data structures, or other logical constructs (e.g., visual devops application 22). Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 602 includes one or more physical devices configured to hold instructions executable by the logic machine to implement the methods and processes described herein. When such methods and processes are implemented, the state of storage machine 602 may be transformed—e.g., to hold different data.

Storage machine 602 may include removable and/or built-in devices. Storage machine 602 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 602 may include volatile, nonvolatile, dynamic, static, read/write, read-only, random-access, sequential-access, location-addressable, file-addressable, and/or content-addressable devices.

It will be appreciated that storage machine 602 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 601 and storage machine 602 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 601 executing instructions held by storage machine 602. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 603 may be used to present a visual representation of data held by storage machine 602. This visual representation may take the form of a graphical user interface (GUI) (e.g., GUI 30 of visual devops application 22) or any other user interface (e.g., a command-line user interface), for example, including an architectural flow diagram which may be viewed/edited as described above. As the herein described methods and processes change the data held by the storage machine, and thus transform the state of the storage machine, the state of display subsystem 603 may likewise be transformed to visually represent changes in the underlying data. Display subsystem 603 may include one or more display devices utilizing virtually any type of technology. Such display devices may be combined with logic machine 601 and/or storage machine 602 in a shared enclosure, or such display devices may be peripheral display devices.

When included, input subsystem 604 may comprise or interface with one or more user-input devices such as a keyboard, mouse, or touch screen. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 605 may be configured to communicatively couple computing system 600 with one or more other computing devices. Communication subsystem 605 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for automatically provisioning a plurality of infrastructure resources offered by one or more infrastructure computers, the method comprising:
   recognizing one or more user interface inputs received from a development computer, the one or more user interface inputs indicating a set of architectural resources including at least one architectural resource requiring two or more infrastructure resources to implement and including a provider-agnostic architectural resource;
   responsive to the one or more user interface inputs received from the development computer, visually presenting a set of architectural nodes in an architectural flow diagram displayed by the development computer, the set of architectural nodes representing the set of architectural resources;
   mapping the set of architectural nodes to a set of infrastructure resources sufficient to implement the set of architectural resources;
   translating the set of infrastructure resources into a computer-readable configuration template having a format useable by a provisioning computer to provision the set of infrastructure resources on the one or more infrastructure computers; and
   electronically transmitting the computer-readable configuration template to the provisioning computer.

2. The method of claim 1, wherein the one or more user interface inputs received from the development computer include graphical user interface inputs associated with a development canvas displayed by the development computer, and wherein the architectural flow diagram is visually presented on the development canvas displayed by the development computer.

3. The method of claim 1, wherein the one or more user interface inputs received from the development computer include command-line inputs from an interactive command-line tool for accessing architectural flow diagrams.

4. The method of claim 1, wherein the one or more user interface inputs received from the development computer indicate a computer-readable configuration template having a format useable by a provisioning computer to provision a set of infrastructure resources on one or more infrastructure computers, and the method further comprising:
   recognizing one or more architectural resources implemented by the set of infrastructure resources; and automatically arranging the set of architectural nodes, in the architectural flow diagram displayed by the development computer, with an automatic layout determined based on relationships among the one or more architectural resources, wherein the automatic layout is not specified in the computer-readable configuration template.

5. The method of claim 1, further comprising visually presenting a monitoring graphical user interface configured to display, for each running architectural resource represented by a corresponding architectural node of the set of architectural nodes in the architectural flow diagram, a user-interface affordance that provides access to status data of the running architectural resource represented by the corresponding architectural node of the set of architectural nodes in the architectural flow diagram.

6. A method for importing an architectural flow diagram from a computer-readable configuration template for provisioning a set of infrastructure resources, the method comprising:
recognizing, in a computer-readable configuration template having a format useable by a provisioning computer to provision a set of infrastructure resources on one or more infrastructure computers, a set of architectural resources derived from the set of infrastructure resources;
automatically arranging a set of architectural nodes representing the set of architectural resources, in an architectural flow diagram displayed by a development computer, with an automatic layout determined based on relationships among architectural resources of the set of the architectural resources, wherein the automatic layout is not specified in the computer-readable configuration template, and wherein a first infrastructure resource in the computer-readable configuration template is associated with an addressable identifier, and a second infrastructure resource in the computer-readable configuration template is associated with the same addressable identifier; and
inferring presence of one or more architectural resources in the automatic layout based on a relationship between the first infrastructure resource and the second infrastructure resource.

7. The method of claim 6, wherein the automatic layout is substantially columnar with a column order indicating a dataflow relationship between architectural nodes in different columns.

8. The method of claim 6, wherein the automatic layout is configured to reduce wire crossings.

9. The method of claim 6, further comprising:
recognizing a change to the architectural flow diagram; and
based on the change to the architectural flow diagram, translating a changed set of infrastructure resources into a changed computer-readable configuration template having the format useable by the provisioning computer to provision the changed set of infrastructure resources on the one or more infrastructure computers.

10. The method of claim 9, further comprising electronically transmitting the changed computer-readable configuration template to the provisioning computer.

11. The method of claim 6, wherein:
each architectural resource in the set of architectural resources is associated with one or more infrastructure resources in the computer-readable configuration template; and
two or more architectural resources in the set of architectural resource are associated with a same infrastructure resource in the computer-readable configuration template.

12. The method of claim 6, further comprising inferring presence of two architectural resources connected by a connecting wire based on the relationship between the first infrastructure resource and the second infrastructure resource.

13. The method of claim 6, further comprising inferring presence of one architectural resource implemented via both the first infrastructure resource and the second infrastructure resource based on the relationship between the first infrastructure resource and the second infrastructure resource.

14. The method of claim 6, further comprising inferring presence of two architectural resources with a containment relationship based on the relationship between the first infrastructure resource and the second infrastructure resource.

15. The method of claim 6, wherein the computer-readable configuration template is a first of a plurality of computer-readable configuration templates defined in a repository, the method further comprising scanning the repository to access the plurality of computer-readable configuration templates, and recognizing further architectural resources based on a second of the plurality of computer-readable configuration templates.

16. A method for monitoring a plurality of infrastructure resources offered by one or more infrastructure computers, the method comprising:
recognizing a selection of a set of architectural resources including a provider-agnostic architectural resource;
visually presenting a set of architectural nodes in an architectural flow diagram displayed by a development computer, the set of architectural nodes representing the set of architectural resources; and
visually presenting a monitoring graphical user interface configured to display, for each architectural resource represented by a corresponding architectural node of the set of architectural nodes in the architectural flow diagram, a user-interface affordance that provides access to status data of the architectural resource represented by the corresponding architectural node of the set of architectural nodes in the architectural flow diagram.

17. The method of claim 16, wherein the status data provided by a user-interface affordance for an architectural resource includes one or more of:
a link to a log for the architectural resource; and
one or more statistics of the architectural resource.

18. The method of claim 16, wherein at least one architectural resource of the set of architectural resources requires two or more infrastructure resources to implement, and wherein the user-interface affordance for the at least one architectural resource provides an aggregated status including status data from each infrastructure resource of the two or more infrastructure resources.

* * * * *